United States Patent [19]

Adamache

[11] Patent Number: 4,871,447

[45] Date of Patent: Oct. 3, 1989

[54] RECOVERY OF ELEMENTAL SULPHUR FROM PRODUCTS CONTAINING CONTAMINATED ELEMENTAL SULPHUR BY FROTH FLOTATION

[75] Inventor: Ion I. Adamache, Calgary, Canada

[73] Assignee: Canterra Energy Ltd., Calgary, Canada

[21] Appl. No.: 14,975

[22] Filed: Feb. 17, 1987

[30] Foreign Application Priority Data

Feb. 20, 1986 [CA] Canada ................................. 502290

[51] Int. Cl.$^4$ .............................................. B03D 1/02
[52] U.S. Cl. ...................................... 209/166; 209/3; 241/24; 423/567 A; 423/578 R
[58] Field of Search ............... 209/164, 165, 166, 167, 209/3; 241/21, 24, 29; 423/511, 567 R, 578 R, 578 A, 567 A; 23/293 S

[56] References Cited

U.S. PATENT DOCUMENTS

| | | | |
|---|---|---|---|
| 1,697,402 | 1/1929 | Nutter | 241/24 |
| 2,088,624 | 8/1937 | Tschudy | 209/164 |
| 2,215,969 | 9/1940 | Maxton | 23/224 |
| 2,423,456 | 7/1947 | Logue | 209/164 |
| 2,471,414 | 5/1949 | Dusher | 209/166 |
| 2,537,842 | 1/1951 | McGarley | 209/166 |
| 2,838,391 | 6/1958 | Kaufman | 209/167 |
| 2,863,732 | 12/1958 | Bowers | 23/224 |
| 3,512,943 | 5/1970 | Dubow | 23/267 |
| 3,634,046 | 1/1972 | Allen . | |
| 4,005,009 | 1/1977 | Kinoshita et al. | 210/44 |
| 4,203,837 | 5/1980 | Hoge et al. | 210/44 |
| 4,270,926 | 6/1981 | Burk, Jr. et al. | 44/15 R |
| 4,425,227 | 1/1984 | Smith | 209/166 |
| 4,472,271 | 9/1984 | Bacon, Jr. | 209/167 |
| 4,486,294 | 12/1984 | Miller et al. | 209/5 |
| 4,552,652 | 11/1985 | Attia et al. | 209/5 |

FOREIGN PATENT DOCUMENTS

| | | |
|---|---|---|
| 151619 | 11/1913 | Canada . |
| 163814 | 7/1915 | Canada . |
| 59-69404 | 4/1984 | Japan . |

OTHER PUBLICATIONS

"Deco-Trefoil"-Technical Disclosure, p. 21, published 9/54.

"Cove Creek Sulfur", by Clarence King, Mining Engineering, vol. 5, #4, 3/53, pp. 375-378.
"Sulfur Recovery from Low Grade Surface Deposits", by Forbath Mining Engineering, vol. 5, #9, 9/53, pp. 881-885.
"Froth Flotation—50th Anniversary", by Fuerstenau, pub. by AIMMP, 1962, p. 274.
"Handbook of Mineral Dressing", by Taggart, copyright 1945, pp. 12-97.
Patent Abstrtacts of Japan, vol. 8, No. 172 (C-237) [1609], 9th Aug. 1984, JP-A-5969406 (Douwa Kogyo K.K.), 19-04-1984.
R. M. Perry et al, "Chemical Engineers' Handbook", 5th Edition, Chapter 21, pp. 65-66.

Primary Examiner—Kenneth M. Schor
Assistant Examiner—Thomas M. Lithgow
Attorney, Agent, or Firm—Merchant, Gould, Smith, Edell, Welter & Schmidt

[57] ABSTRACT

A new "cold" process for the recovery of elemental sulphur from contaminated elemental sulphur products is described. Elemental sulphur is recovered by froth flotation from: contaminated base pads of elemental sulphur blocks, stockpiles of contaminated elemental sulphur; contaminated elemental sulphur rejects from industrial handling and hauling; complex sulphur agglomerate, reject by-product from hot melting processes which is presently unprocessable and discarded (or as is otherwise referred to as "sulphur crete melt residue"); contaminated products resulting from the exploitation processes using wells for the application of heat to reservoirs in order to recover elemental sulphur; and also from other sources of contaminated elemental sulphur in the oil and gas and other industries. This process comprises the steps of coarse screening, crushing, wet grinding, sizing, classifying. Then, the wet ground slurry at ambient temperature is treated by froth flotation, removing the elemental sulphur in the froth, and transporting the undesirable contaminants to storage ponds or subsequent land reclamation. The initial elemental sulphur froth from the first stage of flotation is cleaned one or more times by reflotations. The cleaned elemental sulphur-bearing froth is then filtered to remove excess water and to produce a filter cake.

24 Claims, 4 Drawing Sheets

RECOVERY OF ELEMENTAL SULPHUR FROM PRODUCTS CONTAINING CONTAMINATED ELEMENTAL SULPHUR BY FROTH FLOTATION

The present invention relates to the recovery of elemental sulphur from contaminated products containing elemental sulphur.

The present invention relates particularly to the recovery of elemental sulphur by froth flotation in the oil and gas industry from contaminated base pads of elemental sulphur blocks; stockpiles of contaminated elemental sulphur; contaminated elemental sulphur rejects from industrial handling and hauling; complex sulphur agglomerate, reject by-product from hot melting processes which is presently unprocessable and discarded (or as is otherwise referred to as "sulphur crete melt residue") in spite of the fact that this material could contain up to 85% elemental sulphur; and from other sources of contaminated elemental sulphur in this industry. The process is also applicable for the recovery by froth flotation of elemental sulphur from the contaminated products resulting from the exploitation processes using wells for the application of heat to reservoirs in order to recover elemental sulphur, and also for the recovery of elemental sulphur from contaminated products existing in other industrial processes.

THE BACKGROUND OF THE INVENTION

In the oil and gas and some other industries there are a lot of contaminated products containing elemental sulphur and contaminants such as fine clays, sand, pebbles and gravel, and other inorganic material, as well as organic material, such as humus, wood, leaves and other vegetation. It is important to recover the elemental sulphur from its contaminants. If this is effectively done, the elemental sulphur can be recovered and the environment be improved.

The process of elemental sulphur recovery from contaminated products has been investigated for several years without full commercial and technical success. Basically, hot processes are used to melt the contaminated elemental sulphur and filter or separate by gravity to remove the contaminants from the melted elemental sulphur.

The hot remelt and filtration processes have drawbacks in treating contaminated elemental sulphur materials. Inorganic contaminants cause fouling of heat transfer surfaces in the melting process. This results in lower efficiency and higher operating costs. Also, this process produces a waste product containing up to 85% elemental sulphur. In the melting process, organic contaminants adversely affect the recovery of a high elemental sulphur melt product. The most important organic contaminant is carsul which is a long chain carbon-sulphur compound formed when organic substances come into close contact with molten elemental sulphur and could result in various operating difficulties, such as fouling the process equipment and plugging the filter surfaces.

At Canterra Energy Ltd.'s Ram River gas plant a hot contaminated elemental sulphur recovery system has been studied, constructed, operated, evaluated and shut down. This system had operational problems due to fouling of the heat transfer surfaces. The maximum remelt rate achieved was 2.8 tonnes per hour over a two hour period. The filter screens required cleaning on a continual basis. The system produced an unprocessable by-product in the form of a complex sulphur agglomerate. The sulphur content of this by-product was analyzed by combustion analysis and found to contain 40-60% sulphur. The process was discontinued when operating costs could not be lowered to less than the economic threshold.

There are developments for hot processing systems which have improved waste handling methods and have increased the size of the units. However, the production of high elemental sulphur content waste products still exists.

All hot processes have the disadvantage of producing organic combinations with elemental sulphur which are objectionable and difficult to minimize or eliminate. Also, because all these processes are carried out in a hot environment, they create objectionable enironmental problems.

Additionally, non-hot remelting processes have been investigated, such as:
solvent extraction in which elemental sulphur is taken into solution with a solvent;
burning the contaminated elemental sulphur to $SO_2$ for injection to a Claus recovery plant; however, the contaminant combustion products could adversely affect the recovery plant catalyst;
use of two immiscible liquids which differentiate between elemental sulphur and its contaminants by differences in density and wettability.

The above-mentioned non-hot melting processes have not yet been developed and commercially applied in the oil and gas industry.

In this disclosure a "cold" process (as compared to melting processes) is presented for the recovery of elemental sulphur from contaminated elemental sulphur products existing in the oil and gas industry and in other industries with contaminated elemental sulphur products, which process eliminates the above-mentioned adverse factors related to hot processes and provides a higher recovery of elemental sulphur. This process, which is froth flotation, uses reagents to recover elemental sulphur as a high purity product from an aerated water and solids slurry. The solids are ground to a sufficient fineness which physically frees the elemental sulphur from the contaminants. The contaminants are primarily inorganic materials, such as fine clays, sand, pebbles, and gravel, but some organic materials are also present, such as humus, wood, leaves and other vegetation. The quantity of reagents required is very low and the reagents used are generally not objectionable from an environmental standpoint.

DESCRIPTION OF THE INVENTION

The process is intended to be applied for the recovery of elemental sulphur by a froth flotation process from contaminated base pads of elemental sulphur blocks; stockpiles of contaminated elemental sulphur; contaminated elemental sulphur rejects from industrial handling and hauling, complex sulphur agglomerate, reject by-product from hot melting processes which is presently unprocessable and discarded, and from other sources of contaminated elemental sulphur in this industry. The process is also applicable for the recovery by froth flotation of elemental sulphur from the contaminated products resulting from the exploitation processes using wells for the application of heat to reservoirs in order to recover elemental sulphur and also for the recovery of elemental sulphur from contaminated products existing in other industrial processes.

The contaminated elemental sulphur block base pad material resulting from pouring liquid molten elemental sulphur onto the surface of the soil, which may or may not have been prepared by levelling or other means, is a major source of material for froth flotation. On top of this base pad the sulphur block is later formed. The liquid molten elemental sulphur intermingling and solidifying in the soil creates, largely, physical bonds with the soil and the organic and inorganic impurities existing there. In this manner, the elemental sulphur becomes contaminated with inorganic impurities, such as fine clays, sand, pebbles, and gravel, as well as with organic impurities, such as humus, wood, leaves and other vegetation, resulting in a unique make-up of material. Due to the acidic nature of the precipitation water, after contact with the sulphur base pad, hazards to the environment could occur, and the water should be collected and treated. By processing the elemental sulphur base pad by froth flotation these environmental effects are greatly reduced and significant quantities of elemental sulphur resource is recovered. Likewise, the elemental sulphur products resulting from the exploitation processes using wells for the application of heat to reservoirs in order to recover elemental sulphur could be partially contaminated and be a source of material to be treated by this process, as mentioned above.

The sulphur crete melt residue may contain up to 85% elemental sulphur. It is currently considered untreatable and is a waste product which can be hazardous to the environment. Although the contaminants are thoroughly mixed with elemental sulphur and a unique tightly bound mixture is formed, this complex material is processable by froth flotation, providing another important source of contaminated elemental sulphur to be treated by this process.

The froth flotation process was originally developed in the mining industry but has not been applied for the recovery of elemental sulphur from contaminated elemental sulphur in the oil and gas industry. Metallic and non-metallic ores have been extensively processed by froth flotation. See A.M. Gaudin, "Flotation", 2nd Ed., McGraw-Hill, New York, N.Y., (1957).

Froth flotation is a physico-chemical process of concentrating ground ores which involves chemical treatment of an ore slurry to create conditions favourable for the attachment of certain mineral particles to air bubbles, induced or injected into the system. The air bubbles carry the desired minerals to the surface of the agitated slurry and form a stabilized froth, which is skimmed off while the other undesired minerals remain submerged in the slurry.

The froth flotation process includes the following steps:
grinding the ore to a size sufficiently fine to physically separate the valuable minerals from one another and from the adhering undesired minerals or dirt;
making conditions favourable for the adherence of the minerals of interest to air bubbles;
creating a rising current of air bubbles in the ore slurry; p1 forming a mineral-laden froth on the surface of the slurry; and
skimming off the mineral-laden froth.

The creation of a rising current of air bubbles is accomplished by a flotation machine, which produces bubbles by aeration and machanical agitation of the ore slurry, or by the direct introduction of air under pressure, or both. These operations may be considered as the mechanical phases of the froth flotation process.

To obtain the adherence of the desired mineral particles to the air bubbles, and hence the formation of a mineral-laden froth on the surface of the ore slurry, a hydrophobic surface film must be formed on the particles to be floated and a hydrophilic, or wettable film on all others. This is normally done by means of several classes of chemicals: frothers, promoters/collectors, activators, depressants, as well as regulating/dispersing and sulphidizer reagents.

Theoretically, the froth flotation process can be applied to any mixture of particles that are essentially not adhered to one another and are small enough to be lifted by rising air bubbles. Particles ranging in size from minus 10 mesh (approximately 2 mm) down to a few microns are responsive to flotation. The selection of the proper combination of reagents, particle size and other factors affecting the choice of flotation process for each particular slurry constitutes a principal objective of a laboratory study.

Frothers

The function of frothers in flotation is that of building the froth which serves as the buoyant medium in the separation of flotable from non-flotable minerals. Frothers accomplish this by lowering the surface tension of the liquid, which in turn permits air rising through the slurry to accumulate at the surface in bubble form.

The character of the froth can be controlled by the type of frother. Brittle froths, those which break down readily, are obtained by the alcohol frothers. Frothers, such as creosotes produce a tough air bubble which may be desirable for certain separations. Flotation machine aeration also determines, to a certain extent, the character of the froth. Flotation machines which create finely divided air bubbles and thoroughly diffuse them through the slurry are much more effective than other flotation machines which provide the same volume of air but in larger bubbles.

Promoters/Collectors

The function of promoters/collectors is to increase the flotability of minerals in order to assist their separation from the undesirable mineral fraction, commonly known as gangue. Actually, what happens is that the inherent difference in wettability among minerals is increased and, as a result, the flotability of the more non-wettable minerals is improved to a point where they have an attraction to the air bubbles rising to the surface of the slurry. In practice, the function of promoters/collectors is two-fold, to collect and select the desired minerals.

Activators

The function of activators is to render flotable those minerals which do not normally respond to the action of promoters/collectors. Activators also serve the purpose of again rendering flotable, minerals which have been temporarily depressed in flotation; for example in the flotation of lead sulphide (galena) from zinc sulphide (sphalerite), sodium cyanide and zinc sulphate are used to depress the zinc mineral.

In the experiments performed for the flotation of elemental sulphur, it was not necessary to use this class of reagents.

Depressants

The function of depressants is to prevent temporarily, or sometimes permanently, the flotation of certain minerals while allowing the desired mineral to be floated. Depressants are sometimes referred to as flotation inhibitors. These reagents are typically used in flotation processes in the mineral mining industry.

It has been found that for the flotation of elemental sulphur, in accordance with the present invention, it is not necessary to use this class of reagent.

Regulating/Dispersing Reagents

The function of the reagents included in this catagory is to control the alkalinity of or acidity of the slurry and also to counteract the interfering effect of detrimental slimes (very fine impurity particles, such as: clay, iron oxide and silica or silicates), colloids and soluble salts, which can contaminate the flotation concentrate of elemental sulphur. For the "fine" elemental sulphur flotation of the complex sulphur agglomerate, reject by-product from hot melting processes, sodium silicate was found to be a suitable regulating/dispersing reagent, acting as a slime dispersant. "Coarse" flotation tests indicated that sodium silicate was not affecting the recovery and purity of the elemental sulphur of the samples used.

In most flotation operations, alkaline or neutral slurry conditions are used for the treatment of sulphide ores as well as for many non-sulphide ores. In many flotation operations, there is a given pH range in which optimum results are obtainable. For this reason, proper pH control is of great importance in many flotation applications. The reagents commonly used for pH adjustment are lime (calcium hydroxide or calcium oxide slaked with water), soda ash, or caustic soda to increase pH or alkalinity, and sulphuric acid—sometimes sulphurous acid—to decrease the pH. For the flotation of elemental sulphur, in contrast to the flotation of sulphides where the pH control is necessary, it has been found that pH control is not essential; however, for the corrosion protection of the equipment, lime is helpful.

Sulphidizers

Another class of reagent, sulphidizers, is used to precipitate a film of sulphide on the surface of oxide and carbonate minerals. In this manner, the surface of the minerals is more responsive to the action of promoters which increase the flotability of certain minerals. These reagents are typically used in flotation processes in the mineral mining industry.

This class of reagent is not necessary for the flotation of elemental sulphur in accordance with the process described in the present invention.

Particle Size Selection

The choice of size reduction process was found to be relevant to results in terms of elemental sulphur purity. Generally a "coarse" flotation process is preferable for a feedstock consisting solely of contaminated elemental sulphur and a "fine" flotation process is preferable where the feedstock consists solely of complex sulphur agglomerate, reject by-product resulting from hot melting processes. However a combined "coarse" and "fine" flotation process obtains the best results where both types of feedstock are available.

Objectives of the Invention

An objective of this invention is to provide a process for recovering elemental sulphur from contaminated products containing elemental sulphur, which can be carried out at ambient temperature and reduce or avoid the drawbacks of known hot melting elemental sulphur recovery processes.

An objective of this invention is particularly to provide a process for recovering elemental sulphur from contaminated elemental sulphur existing in the oil and gas industry as sulphur block base pads or stockpiles, obtained as a by-product, which can be carried out at ambient temperature and eliminate the adverse factors related to previously known processes.

A major source of material to be treated by froth flotation is the contaminated elemental sulphur block base pad. This material results from pouring liquid molten elemental sulphur onto the surface of the soil on top of which a block of sulphur was later formed. The soil may or may not have been prepared by levelling or other means. This liquid molten elemental sulphur penetrates, to varying extents, into the soil depending on the permeability and compactness of the soil. The molten elemental sulphur intermingles with and solidifies in the soil creating, generally, physical bonds with the soil and the organic and inorganic impurities existing therein. In this manner, the liquid molten elemental sulphur becomes contaminated with inorganic impurities, such as fine clays, sand, pebbles, and gravel, as well as with organic impurities, such as humus, wood, leaves and other vegetation, resulting in a unique make-up of material. Water of precipitation becomes acidic after contact with elemental sulphur base pads and could be hazardous to the environment. This acidic water should be collected and treated. These environmental effects are greatly reduced by processing the elemental sulphur base pads by froth flotation and simultaneously recovering a significant quantity of elemental sulphur. Likewise, the elemental sulphur products resulting from the exploitation processes using wells for the application of heat to reservoirs in order to recover elemental sulphur, could be partially contaminated and be a source of material to be treated by this process. Also, contaminated elemental sulphur resulting from other industrial processes could be treated by this process to recover elemental sulphur.

Another important source of material for froth flotation is the complex sulphur agglomerate, reject by-product resulting from hot melting processes, which, although it may contain up to 85% elemental sulphur, is currently considered untreatable and is a waste product which becomes an environmental hazard. This material to be treated contains contaminants thoroughly intermingled with elemental sulphur, forming a unique tightly bound mixture which is processable by froth flotation.

A further objective of this invention is to provide two types of flotation: "coarse" flotation, "fine" flotation, as well as a combined "coarse" and "fine" flotation, depending on the characteristics of the materials to be treated. The processes vary as to size reduction and suitable frothers, promoters/collectors and regulating/dispersing reagents.

The present invention, in its broadest aspect, provides a process to be used in the oil and gas industry for the recovery of elemental sulphur from contaminated elemental sulphur products through the process steps of coarse screening, crushing, wet grinding, sizing, classifying. Then, the wet ground slurry at ambient temperature is treated by froth flotation, removing the elemental sulphur in the froth, and transporting the undesirable contaminants to storage ponds or subsequent land reclamation. The Rougher elemental sulphur froth is cleaned one or more times by reflotations. The cleaned elemental sulphur-bearing froth is then vacuum filtered to produce a filter cake. The present invention, more particularly, resides in a process to be used in the oil and gas industry for the recovery by froth flotation of elemental sulphur from contaminated elemental sulphur products, which process comprises the steps of coarse screening and crushing the contaminated elemental sulphur product, wet grinding and sizing for "coarse" flotation utilizing an attrition scrubber as a size reduction apparatus with particles in the slurry finer than 10 mesh with a substantial amount of larger than 48 mesh particles or for "fine" flotation utilizing a ball mill as a size reduction apparatus with particles finer than 48 mesh in the slurry with a substantial amount finer than 100/200 mesh particles, or for a combined "coarse" and "fine" flotation utilizing both an attrition scrubber and a ball mill; classifying the resultant elemental sulphur slurry and densifying it to at least 25% solids; conditioning the slurry with one, two, or three classes of reagents, using frother reagents, promoter/collector reagents and regulating/dispersing reagents; subjecting the slurry-reagent composition to at least one stage of froth flotation (Rougher stage), to produce an elemental sulphur concentrate; and dewatering and filtering the resultant elemental sulphur concentrate.

Detailed Description of the Process

The present invention, more particularly, resides in a process for the treatment of contaminated elemental sulphur from various sources which comprises the following main steps:

(1) Coarse screening and crushing with dust control

It has been found that the contaminated elemental sulphur from the block base pads, stockpiles or any other sources, should be crushed to less than ¾ inch with dust control before any subsequent treatment. This size is adequate for further size reduction.

(2) Wet grinding and size classification

It has been established that further size reduction will be necessary to liberate the elemental sulphur from its contaminants. Depending on the material to be treated, the size reduction for "coarse" flotation will be in the range of finer than 10 mesh with a substantial amount of larger than 48 mesh particles and for "fine" flotation the size reduction will be to finer than 48 mesh with a substantial amount of finer than 100/200 mesh particles. An attrition scrubber is a suitable size reduction apparatus for use in "coarse" flotation while a ball mill is more suitable for "fine" flotation. In wet grinding or attrition scrubbing, the material discharged from the size reduction apparatus must be classified to the desired size and the oversize returned to the size reduction apparatus unit for further size reduction. This is accomplished by pumping the discharge through a wet cyclone or other classification device under pressure or by gravity to a mechanical spiral or rake classifier or vibrating screen and regulating the water to the system to produce the desired solids/water ratio. Wet screening may also be used to produce the desired size separation. It was found that the percentage of solids in the slurry discharged from the classifier sizing system could fluctuate between 15% and 30% solids depending upon the degree of grinding. The finer the material is ground, the lower the percentage of solids in the slurry must be.

(3) Conditioning with reagents

The classified slurry from the classification system is the input material to the flotation process. Before introduction to the flotation circuit the slurry must be mixed or conditioned with reagents. This is accomplished in a tank provided with a propeller and draft tube, the latter to minimize froth build-up and to ensure a thorough mixing of reagents.

(a) Frothers

In the flotation of elemental sulphur it has been found that an alcohol type frother, methyl isobutyl carbinol (MIBC), is effective and necessary for both "fine" and "coarse" flotation. It is believed that this frother not only aids in creating finely divided air bubbles in water but also activates or causes the elemental sulphur to float rapidly.

Other frothers, such as pine oil, may be used but it has been found that the froth is not as brittle and as easily broken down as the froth produced with alcohol type frothers.

It has been found that quantities in the order of 0.08 to 0.50 pounds of MIBC frother per ton* of coarse or finely ground material to be treated is adequate to float all the elemental sulphur even the material of low quality having a small elemental sulphur content.

* The reagent quantities indicated in the text are expressed in pounds per ton of dry material treated. A ton means a short ton, being equal to 2000 lbs. or equal to 0.907 metric tonnes.

Another frother found effective for elemental sulphur flotation is Ultrawet DS**. Elemental sulphur finer than 100 mesh floats readily with this reagent. "Ultrawet DS" is used in quantities in the order of 0.40 to 0.65 pounds per ton of material treated. In this case, no promoter/collector reagent was necessary but another frother, MIBC, was used in the Scavenger stage.

** Trademark for a biodegradable sodium linear alkylate sulfonate anionic surfactant.

In general, alcohol frothers or petroleum based chemical frothers or their combinations will produce good flotation conditions for the recovery of elemental sulphur from contaminated elemental sulphur material.

(b) Promoters/Collectors

By searching different promoters/collectors it has been found that the xanthates, which are normally used in the non-ferrous metal mining industry for flotation processes, are not necessary for elemental sulphur recovery by froth flotation due to the natural flotability of elemental sulphur compared to the low flotability of the contaminants. Also, it has been found that the abovementioned frother, MIBC, can be used both as a frother and promoter/collector. The research done indicates that the use of reagents can be simplified by using only frother reagents instead of two classes of reagents when the elemental sulphur is of a fine size (for example, finer than 100 mesh). However, it has been found that kerosene or fuel oil in small amounts, in the order of 0.36 to 0.50 pounds per ton of material treated, is necessary in the flotation of coarse elemental sulphur (for example, when the elemental sulphur particles are as coarse as 10 mesh).

In the case of using only MIBC it may be necessary to use, as mentioned above, a finer ground slurry and longer flotation time (for instance, in the laboratory experiments, which will be described later on, it was found that the flotation time should be increased from 10 minutes to 15 minutes when using MIBC only).

(c) Regulating/Dispersing Reagents

It has ben found that sodium silicate is effective for the "fine" flotation of the complex sulphur agglomerate, reject by-product resulting from hot melting processes, with finer than 100/200 mesh particles in the slurry, because it can be a dispersant and depressant for very fine impurity particles (clay, iron oxide and silica or silicates). Sodium silicate also aids in obtaining a brittle froth which is desirable for handling through pumps and filters for elemental sulphur concentrate dewatering. Laboratory tests have showed that quantities in the order of 2.0 to 50 pounds of sodium silicate per ton of material treated is necessary on acidic contaminated elemental sulphur slurries. It has been established that elemental sulphur floats well in acidic slurries, as well as in alkaline slurries, so pH control is not necessary. Further investigation and testing have showed that for "coarse" flotation with finer than 10 mesh particles in the slurry, the sodium silicate was not affecting the recovery and the purity of the final elemental sulphur product of the samples tested.

(d) Lime for Minimizing Corrosion of the Flotation Equipment

Lime was used in the experiments at the rotary scrubber and feed end of the size reduction apparatus for minimizing corrosion of the flotation equipment.

(4) Froth Flotation

Laboratory tests showed that for the first stage of flotation—Rougher stage—a retention time in the range of 10 to 15 minutes is normally required.

The slurry, containing reagents, discharged from the conditioner flows into the Rougher stage of the flotation machine where at least ten minutes retention time should be provided for the quantity of material designed to be treated per hour to produce the Rougher flotation concentrate. This flotation machine generally consists of at least six to eight cells in series, where the particles are kept in suspension by mechanical agitation and aeration.

The first stage of flotation will produce a froth which has an impure concentrate due to mechanical entrainment of impurities. For this reason, this concentrate must be cleaned by reflotation in one or more flotation stages to produce a final high purity elemental sulphur concentrate. When the Rougher froth has less than 50% elemental sulphur purity, the Rougher flotation circuit sould include a Scavenger stage. The tailings from the first stage of flotation normally pass through at least two or more cells for tailings clean-up with a retention time of approximately ½ that of the first stage (second stage of flotation—Scavenger stage—which may be included in the Rougher circuit). The froth recovered from these cells is returned to the first stage of flotation for retreatment. The slurry discharged from the final cells of the Scavenger stage is pumped to the tailing handling system. This product is characterized by a very low elemental sulphur content, generally under 5%, along with contaminants.

The froth produced in the first stage of flotation is introduced into the third stage of flotation, if a Scavenger stage is included, or into the second stage of flotation if no Scavenger stage is included. This following stage consists of at least four cells for cleaning (second or third stage of flotation—Cleaner stage).

The froth, which contains the elemental sulphur concentrate from the second or third stage of flotation (Cleaner stage), could be recycled through a third or fourth stage of flotation for further cleaning (Re-Cleaner stage). However, after any stage, if the elemental sulphur recovery and purity are sufficiently high, then the froth could be directed to the filters, by-passing the remaining cleaning stages.

More flotation cleaning stages may be used where a "fine" flotation is employed for at least a portion of the feedstock. The tailings from the second or third stage of flotation (Midds No. 1) are returned to the preceding flotation stage or to the conditioner and join the initial flotation feed for retreatment. The tailings from the third or fourth stage of flotation go back to the cells for the second or third stage of flotation (Midds No. 2) for retreatment. The froth from the last stage of flotation is the final elemental sulphur concentrate.

Laboratory tests showed that the duration of cleaning operations by re-flotation (flotation stages two or three—Cleaner stage and three or four—Re-Cleaner stage) is approximately ½ of the retention time used in the first stage of flotation.

(5) Filtration

The final clean froth, containing the elemental sulphur, must be filtered to remove water.

The resulting filter cake (from the filter) can contain up to 99% or more elemental sulphur (on a dry basis), with approximately 10 to 20% moisture by weight, depending on the elemental sulphur fineness. This final product is then treated in a conventional manner in the existing plant. The filtrate water is re-used in flotation.

Advantages of the Froth Flotation Process

The main advantages of the froth flotation process applied for the recovery of elemental sulphur are the following:

Elemental sulphur is a naturally flotable material, mainly due to its non-wetting nature and high luster. This advantage plus the fact that contaminated elemental sulphur material is friable, as determined by laboratory experiments, provides an ideal application for flotation;

The contaminated elemental sulphur material, being friable, requires minimal size reduction apparatus for crushing and grinding; also, abrasion of the equipment is low due to the friability and softness of the material treated; this situation is advantageous compared to other mining application using froth flotation where abrasion, due to the hardness of the material treated, is an important factor and causes more frequent parts replacement and higher operational costs;

The elemental sulphur has been found to be readily flotable in acid or alkaline slurries without requiring pH control. This is advantageous, eliminating the use of agents for pH control. This fact differentiates the flotation of the contaminated elemental sulphur from the flotation processes applied in the non-ferrous and ferrous mineral mining industry, where pH control is usually necessary for satisfactory flotation results;

A major portion of the organics will be rejected in the flotation tailings and thus very little of the organics will follow the elemental sulphur flotation concentrate;

The froth flotation process can produce high recovery and high purity elemental sulphur from very contaminated elemental sulphur or from complex sulphur agglomerate, reject by-product resulting from not melting processes. This differentiates the froth flotation process from the hot remelt processes because the latter could have processing difficulties when the impurities are in significant quantities and typically, when the percentage of fines is high;

Froth flotation is a "cold" process (compared to melting processes) eliminating environmental dangers, such as:

element sulphur-laden vapours, which are characteristic of all hot processes used for contaminated elemental sulphur recovery;

dusting, since froth flotation is a wet process; this includes the crushing phase where water sprays and wet scrubbers could be incorporated in the system;

The reagent quantities required for elemental sulphur recovery by froth flotation are minimal, for example, in the order of 0.08-0.73 pounds of frother reagent per ton of material treated. In a specific embodiment, the frother used is methyl isobutyl carbinol (MIBC) or other alcohol frothers or their combinations in the range of quantities mentioned above. The promoter/collector reagent, such as kerosene or fuel oil in small amounts (in the order of 0.05 to 0.44 pounds per ton of material treated) can assist in "coarse" flotation of elemental sulphur (finer than 10 mesh particles with a substantial amount of larger than 48 mesh particles in the slurry). If the slurry has finely ground components (for example finer than 48 mesh and specifically finer than 100/200 mesh) the kerosene or fuel oil may be not necessary. Also, the quantity of regulating/dispersing reagent, if it is used as a slime dispersant, is minimal or may even be eliminated. In specific embodiments wherein "fine" flotation of the complex sulphur agglomerate, reject by-product resulting from hot melting processes is utilized, the slime dispersant used is sodium silicate in the range of 2-5 pounds per ton of material treated. Other slime dispersants known by specialists in this field could also be used. Lime, in the range of 1-10 pounds per ton of dry material treated may be used for minimizing corrosion of the flotation equipment, depending on the acidity of the slurry;

The number of classes of reagents for contaminated elemental sulphur flotation is flexible and can be cut down to three (frother, promoter/collector and regulating/dispersing reagents) or two (frother and promoter/collector reagents or frother and regulating/dispersing reagents) or one (frother reagents), depending primarily on the characteristic of the slurry. This is in contrast with the nonferrous mineral mining industry, which represents the largest user of flotation processes, where typically more classes of reagents are used;

The froth flotation installation could be designed and built in modular form which could be transportable, giving flexibility for moving to other sites.

Laboratory Experiments to Demonstrate the Feasibility of the New Process

The following laboratory experiments were carried out in order to demonstrate the feasibility of applying the froth flotation process for the recovery of elemental sulphur from contaminated element sulphur products and from complex sulphur agglomerate, reject by-product resulting from hot melting processes, in the oil and gas industry. Also, the results of these experiments could be used for demonstrating the recovery of the elemental sulphur from such products obtained from other industries.

There are several categories of experiments presented using one, two or three classes of reagents.

Experiments conducted with three classes of reagent (frother, promoter/collector and regulating/dispersing reagents)

Laboratory tests were performed on a batch basis with no recycling of the flotation tailings from the Cleaner stages. Consequently, the elemental sulphur plant recovery will be slightly higher compared to the recovery in the laboratory tests due to the fact that the plant will function continuously with recycling of the cleaner flotation tailings.

Preliminary Flotation Test—Block II Elemental Sulphur Block Base Pad Contaminated with Dirt The sample was unprepared; it was simply collected on the site of the elemental sulphur storage block at a sour gas plant. The sample had the following characteristics:

| Ignition Analysis Results (performed on a dried sample) | |
| --- | --- |
| Ash (%) | Elemental Sulphur Content (%) |
| 52.4 | 47.6 |

The sample has 15% moisture before being dried for ignition analysis.

Procedure: 1000 g of finer than 10 mesh crushed sample was ground 30 minutes with 1000 g of water and 1 g of sodium silicate (equals 2 lbs. per ton of material treated). Grinding was done in a porcelain mill with Coors high density balls to finer than 100 mesh; the pH was 3.60 after grinding and dilution with water to 20% solids. The slurry was conditioned for 2 minutes with 0.08 g of MIBC (equals 0.16 lbs. per ton of material treated) and 0.08 g of kerosene (equals 0.16 lbs. per ton of material treated). The flotation was performed in a D-12 lab flotation machine for 10 minutes to remove the Rougher concentrate elemental sulphur froth. Froth was cleaned twice by reflotation. A quantity of 0.5 g sodium silicate (equals 1 lb. per ton of material treated) was added to each cleaning stage. Flotation time was 5 minutes for each cleaning stage.

TABLE 1

Flotation Results - Preliminary Test

| Product | Weight (g) | Weight (%) | Ignition Analysis Results | | Metallurgical Balance | | Distribution Elemental of Sulphur Recovered (%) |
|---|---|---|---|---|---|---|---|
| | | | Ash-Impurity (%) | Elemental Sulphur-Purity (%) | Ash | Elemental Sulphur | |
| Final Flotation Concentrate | 459.03 | 46.83 | 1.2 | 98.8 | 0.56 | 46.27 | 97.21 |
| Midds No. 1 | 75.13 | 7.66 | | | | | |
| Midds No. 2 | 35.34 | 3.61 | | | | | |
| Flotation Tailings | 410.67 | 41.90 | | | | | |
| Totals | 980.17 | 100.00 | | | | | |

Conclusion: In this test, only the final flotation concentrate was analyzed. The elemental sulphur recovered was calculated on the basis of feed sample analysis:

$$\frac{46.27 \times 100}{47.6} = 97.21\% \text{ elemental sulphur recovery}$$

in which 47.6% represents the elemental sulphur content of the material treated (see ignition analysis results on page 17). Reagents Used:

MIBC 0.16 lbs./ton
Kerosene 0.16 lbs./ton
Sodium Silicate 4.00 lbs./ton

After the preliminary test, four samples were prepared by mixing a known quantity of dirt with a known quantity of molten elemental sulphur. These samples were used for laboratory flotation tests. The characteristics of these samples are shown in Table 2.

TABLE 2

Analysis of the samples used in froth flotation tests No. 1-4 and 7-17.

| Sample Number | Moisture (%) | Ash(*) (%) | Elemental Sulphur Content(*) (%) | $CCl_4$(**) Elemental Sulphur Content (%) |
|---|---|---|---|---|
| 1 | 1.22 | 22.0 | 78.0 | 78.2 |
| 2 | 1.04 | 21.2 | 78.8 | 81.7 |
| 3 | 2.15 | 30.6 | 69.4 | 70.6 |
| 4 | 4.08 | 60.8 | 39.2 | 37.9 |

(*)Ash analyses were performed on dry samples by ignition in a muffle furnace at 900–1000° F. Elemental sulphur content was determined by difference between total weight and ash content.
(**)Elemental sulphur content was determined on dry samples by distillation using carbon tetrachloride ($CCl_4$). The solvent dissolved the elemental sulphur and the insoluble fraction corresponds to the ash content determined by ignition Flotation Test No. 1—using Sample No. 1 (from Table 2)

Grinding: 1000 g of less than 10 mesh crushed contaminated elemental sulphur was used. To this was added 600 g of water plus 1 g of sodium silicate and the mixture was ground for 15 minutes in a porcelain mill with Coors high density ceramic balls. It resulted in a fineness of approximately less than 48 mesh; the percentage of the solids in the slurry was 62.5 by weight. The ground slurry was removed from the mill and diluted with water to 20% solids by weight. The pH of the slurry was 5.60. The pH of the tap water was 7.23.

Conditioning: The slurry was treated with 0.04 g of MIBC frother, 0.04 g of kerosene promoter/collector was mixed for 1 minute. The first stage of flotation—Rougher. The slurry was floated for 10 minutes in a D-12 Denver flotation machine to remove the Rougher sulphur concentrate. During the last 5 minutes of flotation 0.02 g of kerosene promoter/collector was added with 0.02 g of MIBC frother to stabilize the froth.

The second and third stages of flotation—Cleaner and Re-Cleaner. The Rougher flotation concentrate was cleaned and recleaned by reflotation for 5 minutes in each of these two stages. MIBC frother was added in an amount of 0.04 g to each stage to stabilize the froth. The tailings from the Rougher stage are, in this case, the final tailings.

Filtering: All products were filtered, dried and weighed to get the weight distribution.

The following are the main results and material balance on products resulting from this test.

TABLE 3

Flotation Results - Test No. 1

| Product | Weight (g) | Weight (%) | Ignition Analysis Results | | Metallurgical Balance*** | | Distribution of Elemental Sulphur Recovered (%) |
|---|---|---|---|---|---|---|---|
| | | | Ash-Impurity (%) | Elemental Sulphur Purity (%) | Ash | Elemental Sulphur | |
| Final Flotation Concentrate | 761.00 | 77.88 | 2.0 | 98.0 | 1.5576 | 76.3224 | 98.5 |
| Midds No. 1 | 32.50 | 3.33 | 90.0 | 10.0 | 2.9970 | 0.3330 | 0.4* |
| Midds No. 2 | 14.78 | 1.51 | 90.2 | 9.8 | 1.3620 | 0.1480 | 0.2** |
| Flotation Tailing | 168.84 | 17.28 | 96.2 | 3.8 | 16.6234 | 0.6566 | 0.9 |

TABLE 3-continued

| Flotation Results - Test No. 1 | | | | | | |
|---|---|---|---|---|---|---|
| Totals | 977.12 | 100.00 | — | — | 22.5400 | 77.4600 | 100.0 |

*Tailings from the second stage of flotation - cleaning.
**Tailings from the third stage of flotation - recleaning.
***Metallurgical balance is the weight of each product (%) × elemental sulphur purity ignition analysis result (%) divided by 100. This definition is valid for all tests.

| | Ash (%) | Elemental Sulphur Content (%) |
|---|---|---|
| Calculated Feed Analysis | 22.54 | 77.46 (from Table 3 by summation) |
| Feed Sample Analysis by ignition | 22.00 | 78.00 (from Table 2) |
| Feed Sample Analysis by CCl$_4$ | | 78.20 (from Table 2) |

NOTE:
The 1000 g sample taken for this test was not dried; however, all flotation products were dried before weighing to calculate weight ditribution (%). Loss of weight from 1000 g to total dry product expressed by weight was 1000 − 977.12 = 22.8 g; this represents some losses through laboratory manipulation, dissolution of some salts in water and original moisture losses. All calculations are on a dry basis. All flotation products were dried at 94° C. before analysis.

Distribution of elemental sulphur recovered as products from the different stages of flotation is calculated in two steps:

Step 1: The calculationg of the metallurgical balance for a specific product by the formula:

$$\frac{\text{Weight (\%)} \times \text{Ignition Analysis Results}}{100}$$

Step 2: The calculation of the elemental sulphur recovered for a specific product by the formula:

$$\frac{\text{Elemental sulphur metallurgical balance for a specific product}}{\text{Summation of elemental sulphur metallurgical balance for all products}}$$

(i.e. the numerator is the result of Step 1 and the denominator is the summation of all the specific products as in Step 1.)

The following example calculations the elemental sulphur recovery in the final flotation concentrate for test No. 1.

Step 1: The elemental sulphur metallurgical balance for the final flotation concentrate equals 76.3224, calcuated as follows:

$$\frac{77.88 \times 98.0}{100} = 76.3224 \text{ (see Table 3)}$$

Step 2: The elemental sulphur recovered in the final concentrate equals 98.5%, calculated as follows:

$$\frac{76.3224 \times 100}{77.460} = 98.5\% \text{ (see Table 3)}$$

The elemental sulphur remaining in the cleaner and re-cleaner tailings in laboratory experiments noted as Midds No. 1 and Midds No. 2 (from two stage cleaning operations) will be recovered up to 50% in continuous plant operation. This means that the plant elemental sulphur recovery will be slightly higher compared to recoveries shown in the laboratory tests. In this case, recovery of elemental sulphur can increase from 98.5% to 98.8%. These remarks regarding increasing recovery by continuous plant operations are valid on all following laboratory flotation tests. Reagents Used:
MIBC 0.28 lbs./ton
Kerosene 0.20 lbs./ton
Sodium Silicate 2.00 lbs./ton Flotation Test No. 2—using Sample No. 2 (from Table 2)

The procedure and reagents used are identical to Test No. 1. The pH after grinding and dilution with water to 20% solids by weight was 5.94 (slightly acidic). The pH of the tap water was 7.23.

The following are the calculations and material balance on products resulting from this test.

TABLE 4

| | | | Ignition Analysis Results | | Metallurgical Balance | | Distribution of Elemental Sulphur |
|---|---|---|---|---|---|---|---|
| Product | Weight (g) | Weight (%) | Ash-Impurity (%) | Elemental Sulphur Purity (%) | Ash | Elemental Sulphur | Recovered (%) |
| Final Flotation Concentrate | 792.93 | 81.24 | 1.6 | 98.4 | 1.2999 | 79.9402 | 98.25 |
| Midds No. 1 | 32.46 | 3.32 | 87.0 | 13.0 | 2.8884 | 0.4316 | 0.53* |
| Midds No. 2 | 8.65 | 0.89 | 77.0 | 23.0 | 0.6853 | 0.2047 | 0.25** |
| Flotation Tailing | 142.03 | 14.55 | 94.6 | 5.4 | 13.7643 | 0.7857 | 0.97 |
| Totals | 976.07 | 100.00 | — | — | 18.6379 | 81.3622 | 100.00 |

*Tailings from the second stage of flotation - cleaning.
**Tailings from the third stage of flotation - recleaning.

| | Ash (%) | Elemental Sulphur Content (%) |
|---|---|---|
| Calculated Feed Analysis | 18.64 | 81.36 (from Table 4 by summation) |
| Feed Sample Analysis by Ignition | 21.20 | 78.80 (from Table 2) |
| Feed Sample Analysis by CCl$_4$ | | 81.70 (from Table 2) |

Manipulation, soluble and moisture losses = 1000 − 976.07 = 23.93 g

The flotation calculations shown above are on a dry basis for all products. CCl$_4$ extraction of the flotation concentrate shows an elemental sulphur purity of 99.4% as compared to 98.4% elemental sulphur purity determined by ignition [subtracting ash (%) from 100%].

Reagents used:
MIBC, 0.28 lbs./ton
Kerosene, 0.20 lbs./ton
Sodium Silicate, 2.00 lbs./ton The elemental sulphur recovery, including half of the Midds, will be 98.64% with a purity of 96.4%.

Flotation Test No. 3—using Sample No. 3 (from Table 2)

An identical procedure was used to that in Tests No. 1 and 2. The pH after grinding and diluting to 20% solids by weight was 5.64. The pH of the tap water was 7.23.

The following are the calculations and material balance on products resulting from this test.

Manipulation, soluble and moisture losses = 1000 − 971.63 = 28.37 g

The flotation calculations shown above are on a dry basis for all products. CCl$_4$ extraction of the flotation tailing shows a content of 4.2% elemental sulphur as compared to 6.8% by ignition. This indicates more combustible organics (other than sulphur) in the flotation tailings. Reagents Used:
MIBC, 0.28 lbs./ton
Kerosene, 0.20 lbs./ton
Sodium Silicate, 2.00 lbs./ton The elemental sulphur recovery, including half of the Midds, will be 94.92% with a purity of 98%.

Flotation Test No. 4—using Sample No. 4 (from Table 2)

An identical procedure was used to that in Tests No. 1, 2, and 3. The pH after grinding and diluting to 20% solids by weight was 5.32. The pH of the tap water was 7.23.

The following are the calculations and material balance on products resulting from the test.

TABLE 5

Flotation Results - Test No. 3

| Product | Weight (g) | Weight (%) | Ignition Analysis Results | | Metallurgical Balance | | Distribution of Elemental Sulphur Recovered (%) |
| --- | --- | --- | --- | --- | --- | --- | --- |
| | | | Ash-Impurity (%) | Elemental Sulphur-Purity (%) | Ash | Elemental Sulphur | |
| Final Flotation Concentrate | 685.04 | 70.50 | 2.00 | 98.0 | 1.4100 | 69.0900 | 96.07 |
| Midds No. 1 | 43.03 | 4.43 | 82.60 | 17.4 | 3.6590 | 0.7708 | 1.07* |
| Midds No. 2 | 12.50 | 1.29 | 65.40 | 34.6 | 0.8440 | 0.4463 | 0.62** |
| Flotation Tailing | 230.98 | 23.78 | 93.20 | 6.8 | 22.1630 | 1.6170 | 2.24 |
| Totals | 971.63 | 100.00 | — | — | 28.0760 | 71.9240 | 100.00 |

*Tailings from the second stage of flotation - cleaning.
**Tailings from the third stage of flotation - recleaning.

| | Ash (%) | Elemental Sulphur Content (%) |
| --- | --- | --- |
| Calculated Feed Analysis | 28.08 | 71.92 (from Table 5 by summation) |
| Feed Sample Analysis by Ignition | 30.60 | 69.40 (from Table 2) |
| Feed Sample Analysis by CCl$_4$ | | 70.60 (from Table 2) |

TABLE 6

Flotation Results - Test No. 4

| Product | Weight (g) | Weight (%) | Ignition Analysis Results | | Metallurgical Balance | | Distribution of Recovered Sulphur Recovered (%) |
| --- | --- | --- | --- | --- | --- | --- | --- |
| | | | Ash-Impurity (%) | Elemental Sulphur-Purity (%) | Ash | Elemental Sulphur | |
| Final Flotation Concentrate | 337.58 | 34.52 | 2.40 | 97.6 | 0.8285 | 33.6915 | 87.85 |
| Midds No. 1 | 58.90 | 6.02 | 78.80 | 21.2 | 4.7438 | 1.2762 | 3.33* |
| Midds No. 2 | 12.72 | 1.30 | 45.40 | 54.6 | 0.5902 | 0.7098 | 1.85** |
| Flotation Tailing | 568.89 | 58.16 | 95.40 | 4.6 | 55.4846 | 2.6754 | 6.90 |
| Totals | 978.09 | 100.00 | — | — | 61.6471 | 38.3529 | 100.00 |

*Tailings from the second stage of flotation - cleaning.
**Tailings from the third stage of flotation - recleaning.

| | Ash (%) | Elemental Sulphur Content (%) |
| --- | --- | --- |
| Calculated Feed Analysis | 61.65 | 38.35 (from Table 6 by summation) |
| Feed Sample Analysis by Ignition | 60.80 | 39.20 (from Table 2) |
| Feed Sample Analysis by CCl$_4$ | | 37.90 (from Table 2) |

Manipulation, soluble and moisture losses = 1000 − 978.09 = 21.91 g Reagents Used:

MIBC, 0.28 lbs./ton
Kerosene, 0.20 lbs./ton
Sodium Silicate, 2.00 lbs./ton

The elemental sulphur recovery, including half of the Midds, will be 90.44% with a purity of 97.6%.

Flotation Test No. 5—using Sample No. 5 (from Table 7)

Sample No. 5 was collected from complex sulphur agglomerate, reject by-product from hot melting processes which is considered an untreatable product.

TABLE 7

The main characteristics of Sample No. 5 used in froth flotation tests No. 5, 6, 18 and 19.

| Sample Number | Moisture (%) | Ash (%) | Elemental Sulphur Content(*) (%) | CCl4(**) Elemental Sulphur Content (%) |
|---|---|---|---|---|
| 5 | 1.94 | 44.2 | 55.8 | 55.2 |

(*)Ash analyses were performed on dry samples by ignition in a muffle furnace at 900–1000° F. Elemental sulphur content was determined by difference between total weight and ash content.
(**)Elemental sulphur content was determined on dry samples by distillation using carbon tetrachloride ($CCl_4$). The solvent dissolved the elemental sulphur and the insoluble fraction corresponds to the ash content determined by ignition.

An identical procedure was used to that in Tests No. 1, 2, 3, and 4. The pH after grinding and diluting to 20% solids by weight was 3.90. The pH of the tap water was 7.23.

The following are the calculations and material balance on products resulting from this test.

TABLE 8

| | Flotation Results - Test No. 5 | | | | | | |
|---|---|---|---|---|---|---|---|
| | | | Ignition Analysis Results | | Metallurgical Balance | | Distribution of Elemental Sulphur |
| Product | Weight (g) | Weight (%) | Ash-Impurity (%) | Elemental Sulphur Purity (%) | Ash | Elemental Sulphur | Recovered (%) |
| Final Flotation Concentrate | 653.28 | 69.15 | 22.00 | 78.0 | 15.21 | 53.94 | 96.91 |
| Midds No. 1 | 69.75 | 7.38 | 91.80 | 8.2 | 6.77 | 0.61 | 1.10* |
| Midds No. 2 | 35.20 | 3.73 | 87.00 | 13.0 | 3.25 | 0.48 | 0.86** |
| Flotation Tailing | 186.47 | 19.74 | 96.80 | 3.2 | 19.11 | 0.63 | 1.13 |
| Totals | 944.70 | 100.00 | — | — | 44.34 | 55.66 | 100.00 |

*Tailings from the second stage of flotation - cleaning.
**Tailings from the third stage of flotation - recleaning.

| | Ash (%) | Elemental Sulphur Content (%) |
|---|---|---|
| Calculated Feed Analysis | 44.34 | 55.66 (from Table 8 by summation) |
| Feed Sample Analysis by Ignition | 44.20 | 55.80 (from Table 7) |
| Feed Sample Analysis by $CCl_4$ | | 55.20 (from Table 7) |

Manipulation, soluble and moisture losses = 1000 − 944.7 = 55.3 g

The moisture of the flotation concentrate after filtering = 26.4%. Reagents Used:
MIBC 0.28 lbs./ton
Kerosene 0.20 lbs./ton
Sodium Silicate 2.00 lbs./ton The elemental sulphur recovery, including half of the Midds, will be 97.89% with a purity of 78%. Experiments conducted with two classes of reagent only using ground material finer than 100 mesh with two stages of cleaning (frother and regulating/dispersing reagents—without promoter/collector reagents)

Flotation Test No. 6—using Sample No. 5 (Table 7)

An identical procedure was used to that in Test No. 5, except that the grinding time was increased from 15 to 30 minutes in a ceramic ball mill with 62.5% solids. The ground material was finer than 100 mesh.

In the flotation operation, the kerosene reagent was eliminated and only MIBC was added as a frother/collector to float the elemental sulphur. The pH of the slurry at the start of flotation was 4.29. The pH of the tap water was 7.23. The pH after the Rougher flotation was 4.22.

Sodium silicate was added to each of the 2 Cleaner stages. The amount added was 0.5 g in each stage.
Note: A third stage cleaning will help raise the concentrate grade.

The following are the calculations and material balance on products resulting from this test.

TABLE 9

| | Flotation Results - Test No.6 | | | | | | |
|---|---|---|---|---|---|---|---|
| | | | Ignition Analysis Results | | Metallurgical Balance | | Distribution of Elemental Sulphur |
| Product | Weight (g) | Weight (%) | Ash-Impurity (%) | Elemental Sulphur-Purity (%) | Ash | Elemental Sulphur | Recovered (%) |
| Final Flotation Concentrate | 603.00 | 61.57 | 13.20 | 86.8 | 8.13 | 53.44 | 94.32 |
| Midds No. 1 | 108.81 | 11.11 | 84.60 | 15.4 | 9.40 | 1.71 | 3.02* |

TABLE 9-continued

| Flotation Results - Test No.6 | | | | | | | |
|---|---|---|---|---|---|---|---|
| Midds No. 2 Flotation | 32.28 | 3.30 | 76.00 | 24.0 | 2.51 | 0.79 | 1.39** |
| Tailing | 235.28 | 24.02 | 97.0 | 3.0 | 23.30 | 0.72 | 1.27 |
| Totals | 979.37 | 100.00 | — | — | 43.34 | 56.66 | 100.00 |

*Tailings from the second stage of flotation - cleaning.
**Tailings from the third stage of flotation - recleaning.

| | Ash (%) | Elemental Sulphur Content (%) |
|---|---|---|
| Calculated Feed Analysis | 43.34 | 56.66 (from Table 9 by summation) |
| Feed Sample Analysis by Ignition | 44.20 | 55.80 (from Table 7) |
| Feed Sample Analysis by CCl4 | | 55.20 (from Table 7) |

Manipulation, soluble and moisture losses = 1000 − 979.37 = 20.63 g Reagents Used:

MIBC 0.28 lbs./ton
Kerosene none
Sodium Silicate 4.0 lbs./ton

The elemental sulphur recovery, including half of Midds, will be 96.52% with a purity of 86.8%.

Experiments conducted with one class of reagent only (frother reagents—without promoter/collector and regulating/dispersing reagents)

Flotation Test No. 7—using Sample No. 1 (Table 2)

Procedure: 1000 g of Sample No. 1 was ground 15 minutes with 600 g of water in a porcelain mill. The ground material was finer than 100 mesh. After grinding and dilution to 20% solids with water (pH of tap water was 7.23) the pH of the slurry was 5.44. The slurry was transferred to the flotation cell. Nothing floated without reagents. After adding 0.05 g of "Ultrawet DS" and conditioning 1 minute some flotation occurred. Another 0.05 g of "Ultrawet DS" was added and conditioned 2 minutes. Flotation was continued for 5 minutes, then 0.05 g of "Ultrawet DS" was added and flotation continued for 5 minutes more, giving a total of 10 minutes for the Rougher flotation stage.

Afterwards 0.04 g of MIBC frother was added and flotation was continued for 5 minutes to produce a Scavenger concentrate; pH at the end of Scavenger flotation was 6.76.

The Rougher froth concentrate was cleaned for 5 minutes. Near the end of this Cleaner stage, 0.025 g of "Ultrawet DS" were added. Tailings from the Cleaner stage are Midds No. 1. The resultant froth was re-cleaned for 5 minutes. Near the end of the Re-Cleaner stage, 0.025 g of "Ultrawet DS" were added. The tailings from the Re-Cleaner stage are Midds No. 2. The froth obtained in the Re-Cleaner stage is the final elemental sulphur concentrate.

The following are the calculations and material balance on products resulting from this test.

TABLE 10

Flotation Results - Test No. 7

| Product | Weight (g) | Weight (%) | Ignition Analysis Results | | Metallurgical Balance | | Distribution of Elemental Sulphur Recovered (%) |
|---|---|---|---|---|---|---|---|
| | | | Ash-Impurity (%) | Elemental Sulphur-Purity (%) | Ash | Elemental Sulphur | |
| Final Flotation Concentrate | 712.35 | 71.94 | 1.4 | 98.6 | 1.01 | 70.93 | 90.91 |
| Midds No. 1 | 49.95 | 5.04 | 50.8 | 49.2 | 2.56 | 2.48 | 3.18* |
| Midds No. 2 | 25.13 | 2.54 | 21.2 | 78.8 | 0.54 | 2.00 | 2.56** |
| Scavenger Flotation | 20.82 | 2.10 | 40.4 | 59.6 | 0.85 | 1.25 | 1.60*** |
| Tailing | 181.93 | 18.38 | 92.6 | 7.4 | 17.02 | 1.36 | 1.74 |
| Totals | 990.17 | 100.00 | — | — | 21.98 | 78.02 | 100.00 |

*Tailings from the third stage of flotation - cleaning.
**Tailings from the fourth stage of flotation - recleaning.
***Tailings from the second stage of flotation - scavenger.

| | Ash (%) | Elemental Sulphur Content (%) |
|---|---|---|
| Calculated Feed Analysis | 21.98 | 78.02 (from Table 10 by summation) |
| Feed Sample Analysis by Ignition | 22.00 | 78.00 (from Table 2) |
| Sample Analysis by CCl4 | | 78.20 (from Table 2) |

Manipulation, soluble and moisture losses = 1000 − 990.17 = 9.83 g

Reagents Used:
Ultrawet DS 0.40 lbs./ton
MIBC 0.08 lbs./ton (added to Scavenger stage only)

Comments: The "Ultrawet DS" appears to be effective for fine ground elemental sulphur flotation. The froth was brittle and broke down readily. The recovery was lower than in Test No. 1 but elemental sulphur purity was higher.

Assuming 50% of the elemental sulphur in the Midds and Scavenger is recoverable in a continuous plant operation, the total elemental sulphur recovery will be 94.54% with a purity of 98.6%.

In this test, the total consumption of "Ultrawet DS" was 0.20 g, which is equivalent to 0.40 lbs. per ton of dry material treated.

Flotation Test No. 8—using Sample No. 1 (from Table 2)

Procedure: Identical to Test No. 7, but the "Ultrawet DS" reagent was increased by 0.05 g in both Conditioning and Rougher flotation stages, resulting in an increase of 0.10 lbs. per ton for each of these stages. Also, in the second Cleaning stage 0.025 g of "Ultrawet DS" was added (0.05 lbs. per ton). The total "Ultrawet DS" used was 0.325 g (0.65 lbs. per ton of material treated compared to 0.40 lbs. per ton used in the previous test).

After grinding and dilution to 20% solids, the pH was 5.40; the pH after the Rougher flotation was 6.30; the pH of the tap water was 7.23.

The following are the calculations and material balance on products resulting from this test.

TABLE 11

Flotation Results - Test No. 8

| | | | Ignition Analysis Results | | Metallurgical Balance | | Distribution of Elemental Sulphur |
|---|---|---|---|---|---|---|---|
| | | | Ash-Impurity | Elemental Sulphur-Purity | | | |
| Product | Weight (g) | Weight (%) | (%) | (%) | Ash | Elemental Sulphur | Recovered (%) |
| Final Flotation Concentrate | 712.45 | 72.03 | 1.8 | 98.2 | 1.30 | 70.73 | 90.26 |
| Midds No. 1 | 66.43 | 6.72 | 53.6 | 46.4 | 3.60 | 3.12 | 3.98* |
| Midds No. 2 | 26.81 | 2.71 | 35.6 | 64.4 | 0.96 | 1.75 | 2.23** |
| Scavenger Flotation | 27.20 | 2.75 | 38.4 | 61.6 | 1.06 | 1.69 | 2.16*** |
| Tailing | 156.15 | 15.79 | 93.2 | 6.8 | 14.72 | 1.07 | 1.37 |
| Totals | 989.04 | 100.00 | — | — | 21.64 | 78.36 | 100.00 |

*Tailings from the third stage of flotation - cleaning.
**Tailings from the fourth stage of flotation - recleaning.
***Tailings from the second stage of flotation - scavenger.

| | Ash (%) | Elemental Sulphur Content (%) |
|---|---|---|
| Calculated Feed Analysis | 21.64 | 78.36 (from Table 11 by summation) |
| Feed Sample Analysis by Ignition | 22.0 | 78.00 (from Table 2) |
| Feed Sample Analysis by $CCl_4$ | | 78.20 (from Table 2) |

Manipulation, soluble and moisture losses = 1000 − 989.04 = 10.96 g

Reagents Used
"Ultrawet DS" 0.65 lbs./ton

MIBC 0.08 lbs./ton (added to Scavenger stage only)

Comments: Assuming 50% recovery from Midds and Scavenger, total elemental sulphur recovery will be 94.44% with a purity of 98.2% elemental sulphur.

Increasing the amount of "Ultrawet DS" resulted in comparable results with Test No. 7, indicating that higher amounts of this frother are not necessary.

Flotation Test No. 9—using Sample No. 2 (from Table 2)

Procedure: Same procedure as Test No. 8, except that 1.5 g of lime [$Ca(OH)_2$] was added to the slurry, which means 3 lbs. of lime per ton of material treated for minimizing corrosion of the equipment.

After grinding and dilution to 20% solids, pH was 8.63; pH after Rougher flotation was 8.02; pH of the tap water was 7.23.

Flotation reagents, time of flotation, number of clean-up stages are the same as in Test No. 8.

The following are the calculations and material balance on products resulting from this test.

TABLE 12

Flotation Results - Test No. 9

| | | | Ignition Analysis Results | | Metallurgical Balance | | Distribution of Elemental Sulphur |
|---|---|---|---|---|---|---|---|
| | | | Ash Impurity | Elemental Sulphur-Purity | | | |
| Product | Weight (g) | Weight (%) | (%) | (%) | Ash | Elemental Sulphur | Recovered (%) |
| Final Flotation Concentrate | 726.70 | 72.95 | 1.4 | 98.6 | 1.02 | 71.93 | 88.64 |
| Midds No. 1 | 61.86 | 6.21 | 43.8 | 56.2 | 2.72 | 3.49 | 4.30* |
| Midds No. 2 | 43.08 | 4.32 | 38.8 | 61.2 | 1.68 | 2.64 | 3.26** |
| Scavenger Flotation | 29.04 | 2.92 | 31.6 | 68.4 | 0.92 | 2.00 | 2.46*** |
| Tailing | 135.52 | 13.60 | 92.0 | 8.0 | 12.51 | 1.09 | 1.34 |
| Totals | 990.20 | 100.00 | — | — | 18.85 | 81.15 | 100.00 |

*Tailings from tne third stage of flotation - cleaning.
**Tailings from the fourth stage of flotation - recleaning.
***Tailings from the second stage of flotation - scavenger.

| | Ash (%) | Elemental Sulphur Content (%) |
|---|---|---|
| Calculated Feed Analysis | 18.85 | 81.15 (from Table 12 by summation) |
| Feed Sample Analysis by Ignition | 21.20 | 78.80 (from Table 2) |

TABLE 12-continued

Flotation Results - Test No. 9

| Feed Sample Analysis by CCl₄ | 81.70 (from Table 2) |
|---|---|

Manipulation, soluble and moisture losses = 1000 − 990.20 = 9.80 g
Reagents Used:
"Ultrawet DS" 0.65 lbs./ton
MIBC 0.08 lbs./ton (added to Scavenger stage only)
Lime (for minimizing corrosion of the flotation equipment) 3.0 lbs./ton
Comments: Assuming 50% recovery from Midds and Scavenger, in a continuous plant operation, the total elemental sulphur recovery will be 93.65% with a purity of 98.6%.

Addition of lime to the ground material for minimizing corrosion of the equipment can be decreased to about 1.5 lbs. per ton to get a near neutral pH.

Experiments conducted with two classes of reagents only (frother and promoter/collector reagents—without regulating/dispersing reagents)

Flotation Test No. 10—using a composite sample

In this test, a composite sample was used, made up of equal weights from Samples No. 1, 2, 3, and 4 (from Table 2) as follows:

| Sample 1 | 250 g |
|---|---|
| Sample 2 | 250 g |
| Sample 3 | 250 g |
| Sample 4 | 250 g |
|  | 1000 g |

All samples were crushed to minus 10 mesh in a jaw crusher and crushing rolls before testing. The calculated average grade of sulphur was 66.35%.

This composite sample was used for each of Tests No. 10, 11, 12 and 13.

The same procedures were used as in Tests No. 1, 2, 3 and 4, except that no sodium silicate was added to the ground material. A quantity of 0.02 g of MIBC was used in Rougher flotation stage and 0.02 g of kerosene in Scavenger stage. Scavenger froth was kept separate for analysis. The duration of Scavenger flotation was 5 minutes.

After grinding and dilution to 20% solids, the pH was 5.18; the pH after the Rougher flotation was 6.32; the pH of the tap water was 7.23.

The following are the calculations and material balance on products resulting from this test.

TABLE 13

Flotation Results - Test No. 10

| Product | Weight (g) | Weight (%) | Ignition Analysis Results | | Metallurgical Balance | | Distribution of Elemental Sulphur Recovered (%) |
|---|---|---|---|---|---|---|---|
| | | | Ash-Impurity (%) | Elemental Sulphur-Purity (%) | Ash | Elemental Sulphur | |
| Final Flotation Concentrate | 647.75 | 66.09 | 1.7 | 98.3 | 1.1235 | 64.9665 | 95.80 |
| Midds No. 1 | 47.10 | 4.81 | 85.0 | 15.0 | 4.0885 | 0.7215 | 1.06* |
| Midds No. 2 | 16.17 | 1.65 | 53.6 | 46.4 | 0.8844 | 0.7656 | 1.13** |
| Scavenger Flotation | 5.94 | 0.61 | 70.0 | 30.0 | 0.4270 | 0.1830 | 0.27*** |
| Tailing | 263.08 | 26.84 | 95.6 | 4.4 | 25.6590 | 1.1810 | 1.74 |
| Totals | 980.04 | 100.00 | — | — | 32.1824 | 67.8176 | 100.00 |

*Tailings from the third stage of flotation - cleaning.
**Tailings from the fourth stage of flotation - recleaning.
***Tailings from the second stage of flotation - scavenger.

| | Ash (%) | Elemental Sulphur Content (%) |
|---|---|---|
| Calculated Feed Analysis | 32.18 | 67.82 (from Table 13 by summation) |
| Feed Sample Analysis by Ignition | 33.65 | 66.35 (from Table 2 by average) |
| Feed Sample Analysis by CCl₄ | | 67.10 (from Table 2 by average) |

Manipulation, soluble and moisture losses = 1000 − 980.04 = 19.96 g
Reagents Used:
MIBC 0.28 lbs./ton
Kerosene 0.20 lbs./ton
Comments: Total elemental sulphur recovery, including half of the Midds and Scavenger, will be 97.03% with a purity of 98.3%.

This test shows that sodium silicate need not be used in these conditions.

Flotation Test No. 11—using a composite sample.

In this test a composite sample was used made up of equal weights from Samples No. 1, 2, 3 and 4 (from Table 2) as in Test No. 10.

Identical procedures to Test No. 10 were used except that 0.75 g of lime was added to the ground material; this equals 1.5 lbs. of lime per ton of material treated.

After grinding and dilution to 20% solids, the pH was 6.73; the pH after the Rougher flotation was 7.32; the pH of the tap water was 7.23.

The following are the calculations and material balance on products resulting from this test.

TABLE 14

Flotation Results - Test No. 11

| Product | Weight (g) | Weight (%) | Ignition Analysis Results Ash-Impurity (%) | Ignition Analysis Results Elemental Sulphur-Purity (%) | Metallurgical Balance Ash | Metallurgical Balance Elemental Sulphur | Distribution of Elemental Sulphur Recovered (%) |
|---|---|---|---|---|---|---|---|
| Final Flotation Concentrate | 638.90 | 65.00 | 1.8 | 98.2 | 1.1700 | 63.8300 | 94.28 |
| Midds No. 1 | 49.78 | 5.06 | 78.2 | 21.8 | 3.9569 | 1.1031 | 1.63* |
| Midds No. 2 | 12.68 | 1.90 | 40.4 | 59.6 | 0.7676 | 1.1324 | 1.67** |
| Scavenger Flotation | 12.75 | 1.30 | 68.6 | 31.4 | 0.8918 | 0.4082 | 0.60*** |
| Tailing | 262.85 | 26.74 | 95.4 | 4.6 | 25.5100 | 1.2300 | 1.82 |
| Totals | 982.96 | 100.00 | — | — | 32.2963 | 67.7037 | 100.00 |

*Tailings from the third stage of flotation - cleaning.
**Tailings from the fourth stage of flotation - recleaning.
***Tailings from the second stage of flotation - scavenger.

| | Ash (%) | Elemental Sulphur Content (%) |
|---|---|---|
| Calculated Feed Analysis | 32.30 | 67.70 (from Table 14 by summation) |
| Feed Sample Analysis by Ignition | 33.65 | 66.35 (from Table 2 by average) |
| Feed Sample Analysis by CCl₄ | | 67.10 (from Table 2 by average) |

Manipulation, soluble and moisture losses = 1000 − 982.96 = 17.04 g

Reagents Used:
MIBC 0.28 lbs./ton
Kerosene 0.20 lbs./ton
Lime (for minimizing corrosion of the flotation equipment) 1.50 lbs./ton Comments: Total elemental sulphur recovery, including half of the Midds and Scavenger, will be 96.23% with a purity of 98.2%.

The use of lime for minimizing corrosion of equipment doesn't affect the flotation process for elemental sulphur recovery.

Flotation Test No. 12—using a composite sample

In this test, a composite sample was used made up of equal weights from Samples No. 1, 2, 3 and 4 (from Table 2) as in Tests No. 10 and 11.

Identical procedures to Test No. 11 were used except kerosene was replaced by MIBC in Scavenger stage. The Rougher concentrate was subjected to three stages of cleaning instead of two. No lime was added to the ground material.

The pH values were as follows:
after grinding and dilution to 20% solids was 5.24.
after flotation was 6.38.
of the tap water was 7.20.

The following are the calculations and material balance on products resulting from this test.

TABLE 15

Flotation Results - Test No. 12

| Product | Weight (g) | Weight (%) | Ignition Analysis Results Ash-Impurity (%) | Ignition Analysis Results Elemental Sulphur-Purity (%) | Metallurgical Balance Ash | Metallurgical Balance Elemental Sulphur | Distribution of Elemental Sulphur Recovered (%) |
|---|---|---|---|---|---|---|---|
| Final Flotation Concentrate | 637.80 | 64.98 | 1.4 | 98.6 | 0.91 | 64.07 | 94.60 |
| Midds No. 1 | 25.78 | 2.63 | 64.8 | 35.2 | 1.70 | 0.93 | 1.37* |
| Midds No. 2 | 8.54 | 0.87 | 44.4 | 55.6 | 0.39 | 0.48 | 0.71** |
| Midds No. 3 | 5.03 | 0.51 | 25.0 | 75.0 | 0.13 | 0.38 | 0.56*** |
| Scavenger Flotation | 12.32 | 1.26 | 60.2 | 39.8 | 0.76 | 0.50 | 0.70**** |
| Tailing | 292.00 | 29.75 | 95.4 | 4.6 | 28.38 | 1.37 | 2.02 |
| Totals | 981.47 | 100.00 | — | — | 32.27 | 67.73 | 100.00 |

*Tailings from the third stage of flotation - cleaning.
**Tailings from the fourth stage of flotation - recleaning No. 1.
***Tailings from the fifth stage of flotation - recleaning No. 2.
****Tailings from the second stage of flotation - scavenger.

| | Ash (%) | Elemental Sulphur Content (%) |
|---|---|---|
| Calculated Feed Analysis | 32.27 | 67.73 (from Table 15 by summation) |
| Feed Sample Analysis by Ignition | 33.65 | 66.35 (from Table 2 by average) |
| Feed Sample Analysis by CCl₄ | | 67.10 (from Table 2 by average) |

Manipulation, soluble and moisture losses = 1000 − 981.47 = 18.53 g

Reagents Used:
MIBC 0.32 lbs./ton
Kerosene 0.16 lbs./ton

Comments: An additional cleaning stage (the third cleaning stage) improved the elemental sulphur purity and the elemental sulphur recovery only slightly. Total elemental sulphur recovery, including half of the Midds and Scavenger, will be 96.29% with a purity of 98.6%.

Flotation Test No. 13—using a composite sample

In this test, a composite sample was used made up of equal weights from Samples No. 1, 2, 3 and 4 (from Table 2) as in Tests No. 10, 11 and 12.

The same conditions were used as in Test No. 12 except for the following:

The grinding time was 30 minutes, obtaining particle sizes in the order of finer than 100 mesh; the pH of the slurry at 20% solids was 4.91; pH of the tap water was 7.23.

The Rougher flotation froth was heated to 180° F. by injecting live steam into the slurry for 5 minutes before cleaning 3 times by reflotation. MIBC was replaced by kerosene in the Scavenger stage. The pH of tailings after Rougher and Scavenger flotations was 5.36.

The following are the calculations and material balance on products resulting from this test.

TABLE 16

Flotation Results - Test No. 13

| Product | Weight (g) | Weight (%) | Ash-Impurity (%) | Elemental Sulphur-Purity (%) | Metallurgical Balance Ash | Metallurgical Balance Elemental Sulphur | Distribution of Elemental Sulphur Recovered (%) |
|---|---|---|---|---|---|---|---|
| Final Flotation Concentrate | 635.45 | 64.42 | 9.4 | 98.6 | 0.90 | 63.52 | 93.19 |
| Midds No. 1 | 58.30 | 5.91 | 86.8 | 13.2 | 5.13 | 0.79 | 1.14* |
| Midds No. 2 | 25.65 | 2.60 | 40.4 | 59.6 | 1.05 | 1.55 | 2.28** |
| Midds No. 3 | 16.39 | 1.66 | 18.8 | 81.2 | 0.31 | 1.35 | 1.98*** |
| Scavenger Flotation Tailing | 13.80 | 1.48 | 86.4 | 13.6 | 1.21 | 0.19 | 0.28**** |
| | 236.82 | 24.01 | 96.8 | 3.2 | 23.24 | 0.77 | 1.13 |
| Totals | 986.41 | 100.00 | — | — | 31.84 | 68.16 | 100.00 |

*Tailings from the third stage of flotation - cleaning.
**Tailings from the fourth stage of flotation - recleaning No. 1.
***Tailings from the fifth stage of flotation - recleaning No. 2.
****Tailings from the second stage of flotation - scavenger.

| | Ash (%) | Elemental Sulphur Content (%) |
|---|---|---|
| Calculated Feed Analysis | 31.84 | 68.16 (from Table 16 by summation) |
| Feed Sample Analysis by Ignition | 33.65 | 66.35 (from Table 2 by average) |
| Feed Sample Analysis by CCl$_4$ | | 67.10 (from Table 2 by average) |

Manipulation, soluble and moisture losses = 1000 − 986.41 = 13.59 g

Reagents Used:
MIBC 0.28 lbs./ton
Kerosene 0.20 lbs./ton

Comments: Heating did not improve the concentrate purity. Finer grinding lowered the sulphur loss in tailings in this test. Total elemental sulphur recovery, including half of the Midds and Scavenger, will be 96.03% with a purity of 98.6%.

Flotation Test No. 14—using another composite sample

In this test, another composite sample was used, made up of equal weights of Samples No. 2, 3 and 4 (from Table 2) as follows:

| |
|---|
| Sample 2 - 500 g |
| Sample 3 - 500 g |
| Sample 4 - 500 g |
| 1500 g |

All samples were crushed to minus 10 mesh in a jaw crusher and crushing rolls before testing. The calculated average grade of elemental sulphur was 62.47%.

Procedure: The 1500 g composite sample was mixed with 3000 g of water and classified over a 20 mesh screen to remove slime and some fine particles. This simulates classification in a screw or spiral classifier. Since no lime was added, the classifier slurry overflow had a pH of 3.81; the pH of the tap water was 7.23.

The classifier underflow containing approximately 67% solids was ground for 7.5 minutes in an Abbe porcelain mill using steel balls as media resulting in a fineness of less than 48 mesh. Lime (1.5 g) equal to 2 lbs./ton of material treated was added to the mill. The ground slurry removed from the mill was added to the classifier overflow fraction and diluted with water to 25% solids. The pH of this slurry was 6.03.

The 25% solids slurry was conditioned for 3 minutes with 0.06 g of kerosene and the same amount of MIBC frother. Initial Rougher flotation was for 5 minutes. After adding more MIBC and kerosene (0.04 g of each), Rougher flotation was continued for another 5 minutes to remove any remaining flotable elemental sulphur. The pH at the end of the Rougher flotation was 6.56. The flotation tailing slurry contained 9.01% solids and was used further for thickener and filter tests.

The Rougher flotation froth product was cleaned twice with 5 minutes in each stage. Near the end of the first Cleaner stage, it was necessary to add 0.02 g of MIBC to maintain a proper froth. Very little additional elemental sulphur floated during the 5th minute. The pH at the end of the first Cleaner stage was 6.90.

In the second Cleaner stage, after 2.5 minutes flotation, it was necessary to add 0.02 g of each reagent (MIBC and kerosene) to maintain flotation. The elemental sulphur froth product from the second Cleaner stage, after 5 minutes flotation, contained 35.83% solids (this cleaned final concentrate was used for a further vacuum filter test).

The following are the calculations and material balance on products resulting from this test.

The amount of lime added to the mill was 3 lbs./ton of material treated (2.25 g).

In the Rougher flotation stage, only MIBC frother was used. This also applied to the following two cleaning stages.

Since considerable amounts of coarse elemental sulphur did not float with MIBC only, a Scavenger froth was created using kerosene and MIBC.

The following are the calculations and material balance on products resulting from this test.

TABLE 17

Flotation Results - Test No. 14

| Product | Weight (g) | Weight (%) | Ignition Analysis Results | | Metallurgical Balance | | Distribution of Elemental Sulphur Recovered (%) |
| | | | Ash-Impurity (%) | Elemental Sulphur-Purity (%) | Ash | Elemental Sulphur | |
| --- | --- | --- | --- | --- | --- | --- | --- |
| Final Flotation Concentrate | 913.60 | 62.35 | 1.8 | 98.2 | 1.1200 | 61.2300 | 95.54 |
| Midds No. 1 | 101.94 | 6.95 | 84.0 | 16.0 | 5.8400 | 1.1100 | 1.73* |
| Midds No. 2 | 28.80 | 1.97 | 71.0 | 29.0 | 1.4000 | 0.5700 | 0.89** |
| Flotation Tailing | 420.90 | 28.73 | 95.9 | 4.1 | 27.5500 | 1.1800 | 1.84 |
| Totals | 1465.24 | 100.00 | — | — | 35.9100 | 64.0900 | 100.00 |

*Tailings from the second stage of flotation - cleaning.
**Tailings from the third stage of flotation - recleaning.

| | Ash (%) | Elemental Sulphur Content (%) |
| --- | --- | --- |
| Calculated Feed Analysis | 35.91 | 64.09 (from Table 17 by summation) |
| Feed Sample Analysis by Ignition | 37.53 | 62.47 (from Table 2 by average) |
| Feed Sample Analysis by $CCl_4$ | | 63.40 (from Table 2 by average) |

Manipulation, soluble and moisture losses = 1000 − 965.26 = 34.74 g

Reagents Used:
MIBC, 0.19 lbs./ton
Kerosene, 0.16 lbs./ton
Lime (for minimizing corrosion of the flotation equipment), 2.00 lbs./ton Comments: The kerosene floated the coarse elemental sulphur. Total elemental sulphur recovery, including half of the Midds, will be 96.85% with a purity of 98.2%.

Flotation Test No. 15—using the same composite sample as described in Test No. 14

Procedure: The procedure was the same as in Test No. 14, except:

The grinding was done with ceramic instead of steel balls resulting in a fineness of less than 35 mesh.

TABLE 18

Flotation Results - Test No. 15

| Product | Weight (g) | Weight (%) | Ignition Analysis Results | | Metallurgical Balance | | Distribution of Elemental Sulphur Recovered (%) |
| | | | Ash-Impurity (%) | Elemental Sulphur-Purity (%) | Ash | Elemental Sulphur | |
| --- | --- | --- | --- | --- | --- | --- | --- |
| Final Flotation Concentrate | 756.53 | 51.09 | 1.6 | 98.4 | 0.82 | 50.27 | 78.17 |
| Midds No. 1 | 74.02 | 5.00 | 61.6 | 38.4 | 3.08 | 1.92 | 2.99* |
| Midds No. 2 | 17.79 | 1.20 | 52.8 | 47.2 | 0.63 | 0.57 | 0.89** |
| Scavenger Flotation | 163.63 | 11.05 | 13.2 | 86.8 | 1.46 | 9.59 | 14.90*** |
| Tailing | 468.90 | 31.66 | 93.8 | 6.2 | 29.70 | 1.96 | 3.05 |
| Totals | 1480.87 | 100.00 | — | — | 35.69 | 64.31 | 100.00 |

*Tailings from tne third stage of flotation - cleaning.
**Tailings from the fourth stage of flotation - recleaning.
***Tailings from the second stage of flotation - scavenger.

| | Ash (%) | Elemental Sulphur Content (%) |
| --- | --- | --- |
| Calculated Feed Analysis | 33.69 | 64.31 (from Table 18 by summation) |
| Feed Sample Analysis by Ignition | 37.53 | 62.47 (from Table 2 by average) |
| Feed Sample Analysis by $CCl_4$ | | 63.40 (from Table 2 by average) |

Manipulation, soluble and moisture losses = 1000 − 980.87 = 19.13 g
pH of the flotation input = 7.60
pH of the flotation tails = 7.57
The use of reagents through the different stages was as follows:
Ball mill-3.00 lbs/ton Lime
Rougher flotation-0.05 lbs/ton MIBC
Scavenger flotation-0.05 lbs./ton Kerosene, 0.03 lbs./ton MIBC
Cleaning stages-0.06 lbs./ton MIBC each stage
Reagents Used:

MIBC 0.20 lbs./ton
Kerosene 0.05 lbs./ton
Lime (for minimizing corrosion of the flotation equipment), 3.00 lbs./ton
Total elemental sulphur recovery, including half of the Midds and Scavenger, will be 87.56% with a purity of 98.4%.

g of each reagent were added. The final cleaned flotation concentrate contained 39.81% solids.
Reagents Used:
MIBC 0.4 lbs./ton
Kerosene 0.4 lbs./ton
The following are the calculations and material balance on products resulting from this test.

TABLE 19

Flotation Results - Test No. 16

| Product | Weight (g) | Weight (%) | Ignition Analysis Results | | Metallurgical Balance | | Distribution of Elemental Sulphur Recovered (%) |
|---|---|---|---|---|---|---|---|
| | | | Ash-Impurity (%) | Elemental Sulphur-Purity (%) | Ash | Elemental Sulphur | |
| Final Flotation Concentrate | 611.50 | 62.28 | 1.6 | 98.4 | 1.00 | 61.28 | 95.10 |
| Midds No. 1 | 40.69 | 4.14 | 90.0 | 10.0 | 3.73 | 0.41 | 0.64* |
| Midds No. 2 | 16.27 | 1.66 | 52.4 | 47.6 | 0.87 | 0.79 | 1.23** |
| Florrion Tailing −20 mesh | 306.91 | 31.26 | 93.8 | 6.2 | 29.32 | 1.94 | 3.01 |
| Flotation Tailing +14 mesh | 3.16 | 0.32 | 96.52 | 3.48 | 0.31 | 0.01 | 0.01 |
| Flotation Tailing −14 to +20 mesh | 3.30 | 0.34 | 96.36 | 3.64 | 0.33 | 0.01 | 0.01 |
| Total Flotation Tailing(*) | 313.37 | 31.92 | 93.85 | 6.15 | 29.96 | 1.96 | 3.03 |
| Totals | 981.83 | 100.00 | — | — | 35.56 | 64.44 | 100.00 |

*Tailings from the second stage of flotation - cleaning.
**Tailings from the third stage of flotation - recleaning.
(*)The above figures give flotation tailings as produced and before screening out the two oversize fractions.

| | Ash (%) | Elemental Sulphur Content (%) |
|---|---|---|
| Calculated Feed Analysis | 35.56 | 64.44 (from Table 19 by summation) |
| Feed Sample Analysis by Ignition | 37.53 | 62.47 (from Table 2 by average) |
| Feed Sample Analysis by CCl$_4$ | | 63.40 (from Table 2 by average) |

Flotation Test No. 16—using the same composite sample as described in Test No. 14, but the weight of the sample was 1000 g Test Objective: Attrition Scrubbing to replace Ball Milling.

Procedure: 1000 g of the finer than 10 mesh composite sample was attrition scrubbed for 5 minutes with 500 g of water at 67% solids. No lime was added. The pH of the slurry, with 20% solids, was 4.91. The distribution of solid particles in the slurry leaving the attrition scrubber was approximately 20% by weight from finer than 14 mesh to larger than 20 mesh and 80% by weight finer than 20 mesh. The slurry contained large amounts of plus 20 mesh elemental sulphur.

The Rougher flotation feed was conditioned for 3 minutes with 0.06 g of kerosene and 0.06 g of MIBC frother. After 2.5 minutes of flotation, 0.06 more grams of each reagent were added and flotation continued for another 2.5 minutes. The froth was heavy and dense with coarse granular elemental sulphur. A third addition of 0.04 g of each reagent was made and the flotation continued for another 2.5 minutes. No coarse elemental sulphur was noted in the tailings. The pH at the end of 7.5 minutes of Rougher flotation was 5.0. The Rougher flotation froth concentrate was cleaned two times by reflotation, 5 minutes in each stage. No additional reagent was needed in stage 1, but in the second stage 0.04

Manipulation, soluble and moisture losses = 1000 − 981.83 = 18.17 g

Comments:
Attrition scrubbing is a viable alternative to ball milling.
All coarse elemental sulphur (finer than 10 mesh) floated.
Total elemental sulphur recovery, including half of the Midds, will be 96.03% with a purity of 98.4%.
The Rougher flotation time was reduced to 7.5 minutes because there were more granular particles in the slurry which responded faster to flotation.
Analysis of the tailings by three mesh size classification shows the following:
 in the coarsest fraction (+14 mesh) and in the next coarsest fraction (−14 to +20 mesh) of the tailings almost all the elemental sulphur was floated (0.01% unrecovered elemental sulphur);
 the least coarse fraction (−20 mesh) of the tailings contains the most elemental sulphur (3.01% unrecovered elemental sulphur).

Flotation Test No. 17—using Sample No. 3 and Fuel Oil No. 2 in place of kerosene.

Procedure: A 1000 g sample of finer than 10 mesh contaminated elemental sulphur was attrition scrubbed, with 430 g of water, for 5 minutes at 70% solids. The slurry was transferred to the flotation cell and diluted to 20% solids. The pH of the slurry before conditioning was 5.90. pH of the tap water was 7.2 to 7.23.

The slurry was conditioned for 3 minutes with 0.04 g of Fuel Oil No. 2 and 0.04 g of MIBC frother. The total Rougher flotation time was 9 minutes. Additional MIBC and Fuel Oil No. 2 were added to this stage in intervals of 3 minutes each, totalling 0.06 g of each.

The Rougher flotation froth was cleaned and recleaned for 5 minutes in each stage. It was necessary to add 0.04 g of Fuel Oil No. 2 and 0.04 g of MIBC frother to each cleaning stage. The pH of the flotation tailing was 6.01.

Reagents Used:
MIBC 0.36 lbs./ton
Fuel Oil No. 2 0.36 lbs./ton

The following are the calculations and material balance on products resulting from this test.

cles, with three stages of cleaning (frother and regulating/dispersing reagents—without promoter/collector reagents)

Flotation Test No. 18—using Sample No. 5

Procedure: A 1000 g sample of finer than 10 mesh was ground 45 minutes in an Abbe jar mill with Coors high density ceramic balls to finer than 200 mesh. 600 g of water and 1 g of sodium silicate was added to the sample. After diluting to 20% solids, the ground material had a pH of 3.64. The pH of the tap water was 7.25.

The pulp was conditioned 2 minutes with 0.04 g of MIBC frother. After 5 minutes of flotation, another 0.04 g of MIBC was added and flotation continued for 5 minutes, giving a total of 10 minutes to produce the Rougher flotation concentrate. The pH of the flotation tailing was 3.72. The Rougher concentrate was cleaned

TABLE 20

| Flotation Results - Test No. 17 | | | | | | |
|---|---|---|---|---|---|---|
| | | | Ignition Analysis Results | | Metallurgical Balance | Distribution of Elemental Sulphur |
| Product | Weight (g) | Weight (%) | Ash-Impurity (%) | Elemental Sulphur-Purity (%) | Ash / Elemental Sulphur | Recovered (%) |
| Final Flotation Concentrate | 700.40 | 71.33 | 2.2 | 97.8 | 1.57 / 69.76 | 96.67 |
| Midds No. 1 | 36.15 | 3.68 | 86.8 | 13.2 | 3.19 / 0.49 | 0.68* |
| Midds No. 2 | 11.96 | 1.22 | 76.6 | 23.4 | 0.93 / 0.29 | 0.40** |
| Flotation Tailing | 233.34 | 23.77 | 93.2 | 6.8 | 22.15 / 1.62 | 2.25 |
| Totals | 981.85 | 100.00 | — | — | 27.84 / 72.16 | 100.00 |

*Tailings from the second stage of flotation - cleaning.
**Tailings from the third stage of flotation - recleaning.

| | Ash (%) | Elemental Sulphur Content (%) |
|---|---|---|
| Calculated Feed Analysis | 27.84 | 72.16 (from Table 20 by summation) |
| Feed Sample Analysis by Ignition | 30.60 | 69.40 (from Table 2 by average) |
| Feed Sample Analysis by CCl4 | | 70.60 (from Table 2 by average) |

Manipulation, soluble and moisture losses = 1000 − 981.85 = 18.15 g

Comments: Total elemental sulphur recovery, including half of the Midds, will be 97.21% with a purity of 97.8%. Substituting Fuel Oil No. 2 for kerosene did not affect recovery or purity. Fuel Oil can be used as a substitute for kerosene as a flotation reagent.

Experiments conducted with two classes of reagent only on samples finer than 200 mesh and 325 mesh partiin three 5 minute stages, with 0.5 g of sodium silicate added to each cleaning stage. It was also necessary to add 0.02 g of MIBC midway through each cleaning stage.

Reagents Used:
MIBC 0.28 lbs./ton
Sodium Silicate 5.00 lbs./ton

The following are the calculations and material balance on products resulting from this test.

TABLE 21

| Flotation Results - Test No. 18 | | | | | | |
|---|---|---|---|---|---|---|
| | | | Ignition Analysis Results | | Metallurgical Balance | Distribution of Elemental Sulphur |
| Product | Weight (g) | Weight (%) | Ash-Impurity (%) | Elemental Sulphur-Purity (%) | Ash / Elemental Sulphur | Recovered (%) |
| Final Flotation Concentrate | 569.10 | 59.62 | 11.2 | 88.8 | 6.68 / 52.94 | 94.40 |
| Midds No. 1 | 75.10 | 7.86 | 89.7 | 10.3 | 7.05 / 0.81 | 1.40* |
| Midds No. 2 | 35.90 | 3.76 | 78.0 | 22.0 | 2.93 / 0.83 | 1.50** |
| Midds No. 3 | 26.56 | 2.78 | 65.6 | 34.4 | 1.82 / 0.96 | 1.70*** |
| Total Flotation Tailing | 247.85 | 25.98 | 97.8 | 2.2 | 25.41 / 0.57 | 1.00 |
| Totals | 954.51 | 100.00 | — | — | 43.89 / 56.11 | 100.00 |

*Tailings from the second stage of flotation - cleaning.
**Tailings from the third stage of flotation - recleaning No. 1.
***Tailings from the fourth stage of flotation - recleaning No. 2.

TABLE 21-continued

| Flotation Results - Test No. 18 | | |
|---|---|---|
| | Ash (%) | Elemental Sulphur Content (%) |
| Calculated Feed Analysis | 43.89 | 56.11 (from Table 21 by summation) |
| Feed Sample Analysis by Ignition | 44.20 | 55.80 (from Table 7) |
| Feed Sample Analysis by CCl$_4$ | | 55.20 (from Table 7) |

Manipulation, soluble and moisture losses = 1000 − 954.51 = 45.49 g

Comments:

The triple cleaned elemental sulphur flotation concentrate contained 3.12% by weight particles larger than 325 mesh. This oversize fraction analyzed 89.42% elemental sulphur purity. The minus 325 mesh fraction had a calculated analysis of 88.78% elemental sulphur purity.

The third stage of cleaning appears to be more beneficial than grinding to a finer size in producing maximum product purity. Note in Test No. 6 the purity after two stages of cleaning was 86.8% elemental sulphur.

The total elemental sulphur recovery, which will include half of the elemental sulphur content of the Midds, in a continuous plant operation, will be 96.67% with a purity of 88.8%. The pH of the tails from the cleaning stages were as follows:
first stage = 3.88.
second stage = 4.09.
third stage = 4.42.

Flotation Test No. 19—using Sample No. 5

Procedure: The procedure was the same as described in Test No. 18 except:

Grinding time was 60 minutes instead of 45 minutes in order to reduce the material fineness to less than 325 mesh. The pH of the tap water was 7.25.

In the third cleaning stage, the elemental sulphur froth for the first and second 2½ minute flotation periods was kept separate and analyzed to determine the elemental sulphur purity and recovery after the first and after the second period. The pH after Conditioning was 3.72 and after Rougher flotation was 3.69.

The pH of the tails from the cleaning stages were as follows:
first stage = 3.88.
second stage = 4.04.
third stage = 4.39.

Distribution of reagents used in the various stages of flotation was the same as that for Test No. 18. Reagents Used:
MIBC 0.28 lbs./ton
Sodium silicate 5.00 lbs./ton The following are the calculations and material balance on products resulting from this test.

TABLE 22

| | Flotation Results - Test No. 19 | | | | | | |
|---|---|---|---|---|---|---|---|
| | | | Ignition Analysis Results | | Metallurgical Balance | | Distribution of Elemental Sulphur |
| Product | Weight (g) | Weight (%) | Ash-Impurity (%) | Elemental Sulphur-Purity (%) | Ash | Elemental Sulphur | Recovered (%) |
| Flotation Concentrate No. 1 | 257.80 | 26.43 | 8.2 | 91.8 | 2.17 | 24.26 | 43.03 |
| Flotation Concentrate No. 2 | 336.70 | 34.53 | 15.0 | 85.0 | 5.18 | 29.35 | 52.06 |
| Midds No. 1 | 69.88 | 7.17 | 91.8 | 8.2 | 6.58 | 0.59 | 1.04* |
| Midds No. 2 | 39.18 | 4.02 | 82.6 | 17.4 | 3.32 | 0.70 | 1.24** |
| Midds No. 3 | 24.47 | 2.50 | 71.2 | 28.8 | 1.78 | 0.72 | 1.28*** |
| Total Flotation Tailing | 247.20 | 25.35 | 97.0 | 3.0 | 24.59 | 0.76 | 1.35 |
| Totals | 975.23 | 100.00 | — | — | 43.62 | 56.38 | 100.00 |

*Tailings from the second stage of Flotation - cleaning.
**Tailings from the third stage of flotation - recleaning No. 1.
***Tailings from the fourth stage of flotation - recleaning No. 2.

| | Ash (%) | Elemental Sulphur Content (%) |
|---|---|---|
| Calculated Feed Analysis | 43.62 | 56.38 (from Table 22 by summation) |
| Feed Sample Analysis by Ignition | 44.20 | 55.80 (from Table 7) |
| Feed Sample Analysis by CCl$_4$ | | 55.20 (from Table 7) |

Manipulation, soluble and moisture losses = 1000 − 975.23 = 24.77 g

Comments:

A screen analysis of No. 1 and No. 2 combined concentrates showed that 6.38% of the material was larger than 325 mesh. The analysis of this fraction showed 10.82% ash and 89.18% elemental sulphur purity. This is slightly higher tha the 87.95% elemental sulphur purity in the combined total concentrate.

The test shows some of the sulphur is recoverable at a purity over 90% sulphur. The sample analysis of the flotation concentrate No. 1, which was taken during the first 2½ minutes of the third cleaner stage, resulted in 91.8% elemental sulphur purity with a recovery of 43.03%.

Grinding to finer than 100/200 mesh may be fine enough for the flotation of this type of material. Three stages of cleaning should be sufficient for maximum purity of the final flotation concentrate elemental sulphur.

By adding Concentrates No. 1 and No. 2, 60.96% weight elemental sulphur is recovered at a purity of 87.95% sulphur; this is equivalent to a recovery of 95.09% of the total elemental sulphur contained in the material to be treated.

The total elemental sulphur recovery, which will include half of the elemental sulphur content of the Midds, in a continuous plant operation, will be 96.87% with a purity of 87.9%.

The following four experiments—tests No. 20, 21, 22 and 23—were performed using three samples with the characteristics shown in Table 23.

TABLE 23

The main characteristics of Samples No. 100, 200 and 300

| Sample Number | Moisture (%) | Ash* (%) | Elemental Sulphur Content** (%) |
|---|---|---|---|
| 100 | 1.82 | 3.8 | 96.2 |
| 200 | 5.06 | 13.0 | 87.0 |
| 300 | 0.75 | 17.4 | 82.6 |

*Determined on a dry basis, discounting the moisture in the sample.
**See explanation on Table 2.

Experiments conducted with two classes of reagent only (frother and promoter/collector reagents—without regulating/dispersing reagents)

Flotation Test No. 20—using Sample No. 100

This sample was collected from a pile of contaminated elemental sulphur resulting from an elemental sulphur block base pad clean-up at a gas plant.

Procedure: A 1000 g sample of finer than 10 mesh was mixed with 1000 g of tap water (pH=7.73) for about 1 minute and classified (decanted) to remove the slime. The settled solids from which the slime was removed, were attrition scrubbed at 70% solids for 5 minutes to finer than 14 mesh. The scrubbed solids and classifier overflow were mixed and diluted to 20% solids. The pH of the slurry at this point was 5.39. During the attrition scrubbing step, 1 g of lime was added.

This slurry was conditioned for 2 minutes with 0.04 g of kerosene and 0.04 g of MIBC frother.

The Rougher flotation was performed 5 minutes. Following this, 0.04 g of kerosene and 0.04 g of MIBC were added and conditioned for 1 minute. The flotation continued for another 5 minutes. Total flotation time for the Rougher stage was 10 minutes. The pH of the Rougher tailings was 4.62. The Rougher froth was cleaned once by reflotation for 5 minutes to produce a cleaned elemental sulphur concentrate and a cleaner tailing (Middling). Quantities of 0.02 g of kerosene and 0.02 g of MIBC were added during a single cleaning operation since the elemental sulphur product appeared to be very high grade. The pH of the cleaner tailings was 6.89.

The following are the calculations and material balance on products rsulting from this test.

TABLE 24

Flotation Results - Test No. 20

| Product | Weight (g) | Weight (%) | Ignition Analysis Results | | Metallurgical Balance | | Distribution of Elemental Sulphur Recovered (%) |
|---|---|---|---|---|---|---|---|
| | | | Ash-Impurity (%) | Elemental Sulphur-Purity (%) | Ash | Elemental Sulphur | |
| Final Flotation Concentrate | 938.70 | 94.45 | 0.4 | 99.6 | 0.38 | 94.07 | 97.59 |
| Midds No. 1 Flotation | 19.05 | 1.92 | 37.4 | 62.6 | 0.72 | 1.20 | 1.25* |
| Tailing | 37.14 | 3.63 | 69.2 | 30.8 | 2.51 | 1.12 | 1.16 |
| Totals | 993.89 | 100.00 | — | — | 3.61 | 96.39 | 100.00 |

*Tailings from the second stage of flotation - cleaning.

| | Ash (%) | Elemental Sulphur Content (%) |
|---|---|---|
| Calculated Feed Analysis | 3.61 | 96.39 (from Table 24 by summation) |
| Feed Sample Analysis by Ignition | 3.80 | 96.20 (from Table 23) |

Manipulation, soluble and moisture losses = 1000 − 993.89 = 6.11 g Reagents Used:
MIBC 0.20 lbs./ton
Kerosene 0.20 lbs./ton
Lime (for minimizing corrosion of the flotation equipment) 2.00 lbs./ton Comments:

The Rougher froth before cleaning had an elemental sulphur recovery of 98.84% with 98.86% elemental sulphur purity.

Since the feed material had a very low pH (1.73), lime was added at the rate of 2 lbs./ton but it only raised the pH of the Rougher flotation tailings to 4.62. To adequately minimize corrosion of the equipment, the amount of lime added should be increased.

The elemental sulphur showed some tendency of floating before the addition of any kerosene and/or MIBC. After Conditioning with reagents, most of the elemental sulphur floated within 5 minutes, but flotation was continued for 10 minutes to ensure maximum recovery.

The elemental sulphur recovery, including half of the Midds, will be 98.22% with a purity of 99.6%.

Flotation Test No. 21—using Sample No. 200

This sample was collected from a contaminated elemental sulphur pile resulting from the clean-up of an elemental sulphur block base pad at a gas plant.

Procedure: A 1000 g sample of finer than 10 mesh was classified and attrition scrubbed in the same manner as in Test No. 20. The slurry after dilution to 20% solids had a pH of 1.15. Lime was used to minimize corrosion. The pH of the tap water was 7.73. The 20% solids slurry was conditioned for 2 minutes with 0.04 g of kerosene and 0.04 g of MIBC frother.

Rougher flotation was conducted for 10 minutes. After 3 minutes it was necessary to add in stages a total of 0.1 g of kerosene and 0.1 g of MIBC to float all the coarse sulphur. The Rougher flotation tailings had a pH of 1.42. The Rougher froth was cleaned for 5 minutes. After 2.5 minutes of flotation 0.04 g of kerosene and 0.04 g of MIBC were added to float the coarse sulphur. The Cleaner tailings (Midds No. 1) had a pH of 1.79.

Recleaning time was 5 minutes. Quantities of 0.04 g of kerosene and 0.04 g of MIBC were added to the Re-Cleaner stage. The Midds No. 2 had a pH of 2.34.

The following are the calculations and material balance on products resulting from this test.

TABLE 25

| | | | | | | | Distri-bution of |
|---|---|---|---|---|---|---|---|
| | | | Ignition Analysis Results | | | | |
| | | | Ash-Impurity | Elemental Sulphur-Purity | Metallurgical Balance | | Elemental Sulphur Recovered |
| Product | Weight (g) | Weight (%) | (%) | (%) | Ash | Elemental Sulphur | (%) |
| Final Flotation Concentrate | 834.40 | 85.22 | 0.6 | 99.4 | 0.51 | 84.71 | 95.45 |
| Midds No. 1 | 23.25 | 2.37 | 50.6 | 49.4 | 1.20 | 1.17 | 1.32* |
| Midds No. 2 | 14.86 | 1.52 | 30.0 | 70.0 | 0.46 | 1.06 | 1.20** |
| Flotation Tailing | 106.67 | 10.89 | 83.4 | 16.6 | 9.08 | 1.81 | 2.03 |
| Totals | 979.18 | 100.00 | — | — | 11.25 | 88.75 | 100.00 |

*Tailings from the second stage - cleaning.
**Tailings from the third stage - recleaning.

| | Ash (%) | Elemental Sulphur Content (%) |
|---|---|---|
| Calculated Feed Analysis | 11.25 | 88.75 (from Table 25 by summation) |
| Feed Sample Analysis by Ignition | 13.00 | 87.00 (from Table 23) |

Manipulation, soluble and moisture losses = 1000 − 979.18 = 20.82 g Reagents Used:
MIBC 0.44 lbs./ton
Kerosene 0.44 lbs./ton
Lime (for minimizing corrosion of the flotation equipment) 2.00 lbs./ton Comments:

The elemental sulphur recovery, including half of the Midds, will be 96.70% with a purity of 99.4%.

This particular sample required more reagent than Sample No. 100 (Test No. 20) to float all the coarse sulphur. This may be due to the high acidity (low pH of 1.42 of the flotation tailings). A higher quantity of lime will be required, in the order of 3 to 4 times the amount used in this test to minimize the corrosion of the equipment.

There was no tendency for the sulphur to float before adding the kerosene and MIBC.

Experiments conducted with two classes of reagent only on samples finer than 65 mesh and 200 mesh particles, with three stages of cleaning (frother and regulating/dispersing reagents—without promoter/collector reagents)

Flotation Test No. 22—using Sample No. 300

This sample was collected from the complex sulphur agglomerate, reject by-product from hot melting processes at a gas plant. This waste is considered unprocessable by known methods.

Procedure: A 1000 g sample of the finer than 10 mesh crushed complex sulphur agglomerate material was ground with 500 g of water for 30 minutes at 67% solids in a porcelain mill with ceramic balls to finer than 65 mesh. A quantity of 1 g of sodium silicate was added to the mill. At 20% solids, the slurry had a pH of 2.23. The pH of the tap water was 7.73.

The slurry was conditioned for 2 minutes with 0.04 g of MIBC frother. Flotation was conducted for a total of 10 minutes. At the end of 5 minutes, 0.04 g of MIBC was added. Very little sulphur floated in the second 5 minutes period. Flotation tailings had a pH of 2.67. The Rougher froth was cleaned three times, 5 minutes in each stage. Midway through each 5 minute period 0.05 g of sodium silicate and 0.04 g of MIBC were added. The pH of the Midds No. 1, 2 and 3 was 3.78, 4.11 and 6.87 respectively.

The following are the calculations and material balance on products resulting from this test.

TABLE 26

| | | | | | | | Distri-bution of |
|---|---|---|---|---|---|---|---|
| | | | Ignition Analysis Results | | | | |
| | | | Ash-Impurity | Elemental Sulphur-Purity | Metallurgical Balance | | Elemental Sulphur Recovered |
| Product | Weight (g) | Weight (%) | (%) | (%) | Ash | Elemental Sulphur | (%) |
| Final Flotation Concentrate | 876.40 | 90.74 | 12.1 | 87.9 | 10.98 | 79.76 | 93.79 |
| Midds No. 1 | 25.76 | 2.67 | 35.6 | 64.4 | 0.95 | 1.72 | 2.02* |

TABLE 26-continued

| Flotation Results - Test No. 22 | | | | | | | |
|---|---|---|---|---|---|---|---|
| Midds No. 2 | 23.75 | 2.46 | 18.6 | 81.4 | 0.46 | 2.00 | 2.35** |
| Midds No. 3 | 14.70 | 1.52 | 16.0 | 84.0 | 0.24 | 1.28 | 1.51*** |
| Flotation Tailing | 25.22 | 2.61 | 89.2 | 10.8 | 2.33 | 0.28 | 0.33 |
| Totals | 965.83 | 100.00 | — | — | 14.96 | 85.04 | 100.00 |

*Tailings from the second stage of flotation - cleaning.
**Tailings from the third stage of flotation - recleaning No. 1.
***Tailings from the fourth stage of flotation - recleaning No. 2.

| | Ash (%) | Elemental Sulphur Content (%) |
|---|---|---|
| Calculated Feed Analysis | 19.46 | 85.04 (from Table 26 by summation) |
| Feed Sample Analysis by Ignition | 17.40 | 82.60 (from Table 23) |

Manipulation, soluble and moisture losses = 1000 − 965.83 = 34.17 g

Reagents Used:
MIBC 0.40 lbs./ton
Sodium silicate 5.00 lbs./ton

The elemental sulphur recovery, including half of the Midds, will be 96.73% with a purity of 87.9%.

Flotation Test No. 23—using Sample No. 300

Procedure: A 100 g sample of finer than 10 mesh crushed complex sulphur agglomerate material was ground with 600 g of water and 1 g of sodium silicate in the ceramic mill with Coors ceramic balls. After 30 minutes of grinding the slurry was classified at 200 mesh and the larger than 200 mesh solids returned to the mill for another 30 minutes of grinding. Total ground solids which were finer than 200 mesh, after dilution to 20% solids, had a pH of 3.41. This slurry was conditioned for 2 minutes with 0.04 g of MIBC frother.

The Rougher flotation was conducted for a total of 7 minutes. At the end of 5 minutes, 0.02 g of MIBC was added and flotation continued for 2 minutes. The Rougher froth had a more yellowish colour than that obtained in Test No. 22, which was approximately a 65 mesh grind. The Rougher tailings had a pH of 3.58.

The Rougher froth was cleaned three times with 5 minutes in each stage. In the third stage 0.02 g of MIC was added. A quantity of 0.5 g of sodium silicate was added to each Cleaner stage. The pH was 4.08, 4.34 and 4.80 respectively for Midds, 1, 2 and 3. The final elemental sulphur froth had a yellowish colour.

The following are the calculations and material balance on products resulting from this test.

TABLE 27

| | | | Ignition Analysis Results | | Metallurgical Balance | | Distribution of Elemental Sulphur |
|---|---|---|---|---|---|---|---|
| Product | Weight (g) | Weight (%) | Ash-Impurity (%) | Elemental Sulphur-Purity (%) | Ash | Elemental Sulphur | Recovered (%) |
| Final Flotation Concentrate | 834.90 | 85.31 | 6.2 | 93.8 | 5.29 | 80.02 | 93.86 |
| Midds No. 1 | 46.44 | 4.75 | 60.8 | 34.2 | 2.89 | 1.86 | 2.18* |
| Midds No. 2 | 26.39 | 2.70 | 50.6 | 49.4 | 1.37 | 1.33 | 1.57** |
| Midds No. 3 | 27.03 | 2.76 | 33.4 | 66.6 | 0.92 | 1.84 | 2.16*** |
| Flotation Tailing | 43.87 | 4.48 | 95.6 | 4.4 | 4.28 | 0.20 | 0.23 |
| Totals | 978.63 | 100.00 | — | — | 14.75 | 85.25 | 100.00 |

*Tailings from the second stage of flotation - cleaning.
**Tailings from the third stage of flotation - recleaning No. 1.
***Tailings from the fourth stage of flotation - recleaning No. 2.

| | Ash (%) | Elemental Sulphur Content (%) |
|---|---|---|
| Calculated Feed Analysis | 14.75 | 85.25 (from Table 27 by summation) |
| Feed Sample Analysis by Ignition | 17.40 | 82.60 (from Table 23) |

Manipulation, soluble and moisture losses = 1000 − 978.63 = 21.37 g

Reagents Used:
MIBC 0.16 lbs./ton
Sodium silicate 5.00 lbs./ton

Comments:
The elemental sulphur recovery, including half of the Midds, will be 96.82% with a purity of 93.8%.

Finer grinding definitely improves the grade and elemental sulphur recovery. The reagent quantities and Rougher flotation time were also less for the 200 mesh ground material.

Experiment conducted with two classes of reagent only (frother and promoter/collector—without regulating/dispersing reagents)

Flotation Test No. 13—Using Sample No. 101

This sample was collected from a pile of contaminated elemental sulphur resulting from an elemental sulphur base pad clean-up at a gas plant.

TABLE 28

The main characteristics of sample No. 101

| Moisture (%) | Ash (%) | Elemental Sulphur Content (%) | CCl4 Elemental Sulphur Content (%) |
|---|---|---|---|
| 0.2 | 1.40 | 98.60 | 98.89 |

Procedure: A 1000 g sample of finer than 10 mesh was attrition scrubbed for 5 minutes with 500 g of tap water, pH=7.6, and 2 g lime. After removal from the attrition scrubber, the slurry was diluted from 67% to 20% solids and had a pH of 12.47. The 20% solids slurry was conditioned for 2 minutes with 0.04 g of both kerosene and MIBC.

After 3 minutes of flotation, 0.04 g of both kerosene and MIBC were added. The flotation continued for another 4 minutes. Total flotation time was 7 minutes. The pH of the rougher flotation tailing was 11.76. The Rougher froth was cleaned for a total of 5 minutes. Midway through the cleaning stage, 0.02 g of both kerosene and MIBC were added to float the coarse sulphur. The pH of the Cleaner tailing (Midds No. 1) was 9.60.

The following are the calculations and material balance on products resulting from this test.

TABLE 29

Flotation Results - Test No. 24

| Product | Weight (g) | Weight (%) | Ignition Analysis Results Ash-Impurity (%) | Ignition Analysis Results Elemental Sulphur-Purity (%) | Metallurgical Balance Ash | Metallurgical Balance Elemental Sulphur | Distribution of Elemental Sulphur Recovered (%) |
|---|---|---|---|---|---|---|---|
| Final Flotation Concentrate | 970.0 | 97.24 | 0.2 | 99.8 | 0.19 | 97.08 | 98.32 |
| Midds No. 1 | 8.65 | 0.87 | 22.8 | 77.2 | 0.2 | 0.67 | 0.68* |
| Flotation Tailing | 18.6 | 1.8 | 47.0 | 53.0 | 0.8 | 0.99 | 1.00 |
| TOTAL | 997.2 | 100.0 |  |  | 1.26 | 98.74 | 100.00 |

*Tailings from the second stage of flotation - cleaning.

|  | Ash (%) | Elemental Sulphur Content (%) |
|---|---|---|
| Calculated Feed Analysis | 1.26 | 98.74 (from Table 29 by summation) |
| Feed Sample Analysis by Ignition | 1.40 | 98.60 (from Table 28) |
| Feed Sample Analysis by CCl4 | 1.11 | 98.89 (from Table 28) |

Manipulation, soluble and moisture losses = 1000 − 997.27 = 2.73

Reagents Used:
MIBC 0.20 lbs./ton
Kerosene 0.20 lbs./ton
Lime 4.00 lbs./ton (added to the attrition scrubbing only)

Comments:
The elemental sulphur recovery, including half of the Midds, will be 98.66% with a purity of 99.8%.

A second stage of Cleaning was not necessary because the concentrate appeared very pure.

The high pH (12.47–9.60) did not appear to have any adverse effect on flotation of the elemental sulphur.

Experiment conducted with two classes of reagent only (frother and promoter/collector—without regulating/dispersing reagents)

Flotation Test No. 25—using Sample No. 500

This test was performed on a contaminated elemental sulphur sample from an elemental sulphur base pad at a gas plant.

TABLE 30

The main characteristics of sample No. 500

| Moisture (%) | Ash (%) | Elemental Sulphur Content (%) |
|---|---|---|
| 3.25 | 5.7 | 94.3 |

Procedure: A 1000 g estimated dry sample of less than 10 mesh was attrition scrubbed for 15 minutes with 600 g of tap water (pH=7.47), at 62.5% solids. The slurry removed from the attrition scrubber was diluted with 20% solids and had a pH of 1.54. The 20% solids slurry was conditioned for 2 minutes with 0.04 g MIBC and 0.04 g kerosene.

Three minutes of flotation followed to remove the elemental sulphur froth. After adding 0.04 g of both MIBC and kerosene, the flotation continued for 4 minutes. Another addition of 0.04 g of each reagent was necessary and flotation continued for another 3 minutes. Very little sulphur floated in this last period. The total flotation time was 10 minutes. The pH of the tailing was 1.84. No coarse sulphur remained in the tailing.

Two Cleaner stages, of 5 minutes each, followed. Midway through each stage, 0.04 g of MIBC and 0.04 g of kerosene were added. The pH of the Cleaner tailings were 2.19 and 2.92 respectively.

The following are the calculations and material balance on product resulting from this test.

TABLE 31

Flotation Results - Test No. 25

| | Weight | Weight | Ignition Analysis Results Ash-Impurity | Ignition Analysis Results Elemental Sulphur-Purity | Metallurgical Balance | Distribution of Elemental Sulphur Recovered |
|---|---|---|---|---|---|---|
| | | | | | Elemental | |

TABLE 31-continued

| | Flotation Results - Test No. 25 | | | | | | |
|---|---|---|---|---|---|---|---|
| Product | (g) | (%) | (%) | (%) | Ash | Sulphur | (%) |
| Final Flotation Concentrate | 940.30 | 93.12 | 1.00 | 99.00 | 0.93 | 92.19 | 98.19 |
| Midds No. 1 | 14.02 | 1.39 | 59.80 | 40.20 | 0.83 | 0.56 | 0.59* |
| Midds No. 2 | 6.99 | 0.69 | 38.60 | 61.40 | 0.27 | 0.42 | 0.45** |
| Flotation Tailing | 48.46 | 4.80 | 85.00 | 15.00 | 4.08 | 0.72 | 0.77 |
| TOTAL | 1009.7 | 100.0 | | | 6.11 | 93.89 | 100.00 |

*Tailings from the second stage of flotation - cleaning.
**Tailings from the third stage of flotation - recleaning.

| | Ash (%) | Elemental Sulphur Content (%) |
|---|---|---|
| Calculated Feed Analysis | 6.11 | 93.89 (from Table 31 by sumation) |
| Feed Sample Analysis by Ignition | 5.70 | 94.30 (from Table 30) |

Manipulation, soluble and moisture losses = 1034 − 1009.77 = 24.23

Reagents Used:
MIBC 0.40 lbs/ton
Kerosene 0.40 lbs/ton

Comments:
The elemental sulphur recovery, including half of the Midds, was 98.71% with a purity of 99.00%.

Some very fine colloidal sulphur remained in the tails. Also, considerable particles of organics concentrated in the tails indicated that the elemental sulphur could be lower than 15% reported above.

Experiment conducted with two classes of reagent only (frother and regulating/dispersing—without promoter/collector reagent)

Flotation Test No. 26—Using Sample No. 301

This sample was collected from complex sulphur agglomerate, reject by-product from settling tank bottoms ("sulphur crete melt residue").

TABLE 32

| The main characteristics of sample No. 301 | | | |
|---|---|---|---|
| Moisture (%) | Ash (%) | Elemental Sulphur Content (%) | $CCl_4$ Elemental Sulphur Content (%) |
| 0.20 | 29.4 | 70.6 | 69.23 |

Procedure: A 1000 g of crushed sample—less than 10 mesh—was ground for 75 minutes, in a porcelain mill with Coors high density ceramic balls, at 62% solids. One (1) gram of sodium silicate was added to the mill. 97% of the resulting ground material was finer than 200 mesh. After removal from the mill, the slurry was diluted to 20% solids. The pH = 6.11.

The Conditioning stage lasted for 2 minutes, adding 0.04 g of MIBC. This slurry was further floated for 8 minutes. 0.04 g of MIBC was used and the flotation continued for another 2 minutes. Very little sulphur floated during these 2 minutes. The rougher flotation tailings had a pH of 6.88.

This product was cleaned in 3 stages of 5 minutes. To each cleaning stage 0.5 g of sodium silicate was added. To the last Cleaner stage 0.02 g of MIBC was also added. The pH of each Cleaner tailing was 7.18, 7.44 and 7.66 respectively.

The following are the calculations and material balance on products resulting from this test.

TABLE 33

| | Flotation Results - Test No. 26 | | | | | | |
|---|---|---|---|---|---|---|---|
| | | | Ignition Analysis Results | | Metallurgical Balance | | Distribution of Elemental Sulphur |
| Product | Weight (g) | Weight (%) | Ash-Impurity (%) | Elemental Sulphur-Purity (%) | Ash | Elemental Sulphur | Recovered (%) |
| Final Flotation Concentrate | 786.20 | 81.14 | 11.4 | 88.6 | 9.25 | 71.89 | 97.45 |
| Midds No. 1 | 44.26 | 4.57 | 90.4 | 9.6 | 4.13 | 0.44 | 0.60* |
| Midds No. 2 | 32.69 | 3.37 | 79.8 | 20.2 | 2.69 | 0.68 | 0.92** |
| Midds No. 3 | 13.7 | 1.42 | 80.0 | 20.0 | 1.14 | 0.28 | 0.38*** |
| Flotation Tailing | 92.08 | 9.50 | 95.0 | 5.0 | 9.02 | 0.48 | 0.65 |
| TOTAL | 968.97 | 100.00 | — | — | 26.23 | 73.77 | 100.00 |

*Tailings from the second stage of flotation - cleaning.
**Tailings from the third stage of flotation - recleaning No. 1.
*** Tailings from the fourth stage of flotation - recleaning No. 2.

| | Ash (%) | Elemental Sulphur Content (%) |
|---|---|---|
| Calculated Feed Analysis | 26.23 | 73.77 (from Table 33 by summation) |
| Feed Sample Analysis by | 29.40 | 70.60 (from Table 32) |

TABLE 33-continued

Flotation Results - Test No. 26

Ignition
Manipulation, soluble and moisture losses = 1034 − 968.97 = 31.03
  Reagents Used:
  MIBC 0.20 lbs/ton
  Sodium Silicate 5.00 lbs/ton
  Comments:
  The elemental sulphur recovery, including half of the Midds, was 98.41% with a purity of 88.6% even with a minimal quantity of MIBC frother and three stages of cleaning.
  The froth was voluminous but it broke down nicely.
  The concentrate had a greyish appearance which is typical for the "sulphur crete" material.
  Experiment conducted with one class of reagent only (frother reagent—without promoter/collector and regulating/dispersing reagents)

Flotation Test No. 27—Using Sample No. 301

The sample description is identical to that used in test No. 26. The main characteristics of the sample are given in Table 32.

Procedure: A 1000 g of crushed sample—less than 10 mesh—was ground for 60 minutes in a porcelain mill with Coors high density ceramic balls, at 62% of solids. The resulting ground material was classified to 200 mesh. The oversize portion was ground for another 15 minutes until 97% of the material was finer than 200 mesh. After dilution to 20% solids, the pH was 6.19.

The slurry was conditioned for 2 minutes with 0.04 g of MIBC.

The Rougher flotation stage followed for 10 minutes. After the first 5 minutes, an addition of 0.04 g of MIBC was necessary. The Rougher froth was voluminous and difficult to break down. The pH of the tailing was 6.92.

Three Cleaner stages of 5 minutes each were performed. Midway through each stage, 0.02 g of MIBC were added. The pH of the Middling No. 1, 2 and 3 were 7.20, 7.40 and 7.68 respectively.

The following are the calculations and material balance on products resulting from this test.

Manipulation, soluble and moisture losses = 1000 − 979.27 = 20.73
  Reagents Used:
  MIBC 0.28 lbs/ton
  Comments:
  The elemental sulphur recovery, including half of the Midds, was 99.06% with a purity of 85.8%.
  The froth was very tough and difficult to clean. The sulphur purity could be improved by using sodium silicate to obtain a more bittle froth (see test No. 26).
  Experiment conducted with two classes of reagent only (frother and promoter/collector—without regulating/dispersing reagents)

Flotation Test No. 28—Using a Composite Sample

A composite sample was made up as follows:
  95% sample No. 500—contaminated elemental sulphur base pad
  5% sample No. 301—complex sulphur agglomerate, reject by-product from hot melting processes
  The main characteristics of these samples are presented in Tables 30 and 32.

Procedure: The following steps were applied:

Attrition Scrubbing: 959 grams of sample No. 500, finer than 10 mesh, was scrubbed 15 minutes at 67% solids with 468 grams of water.

Ball Milling: 50 grams of sample No. 301 was ball milled 30 minutes at 60% solids with 33 grams of water. Grinding was done in a small Abbe porcelain mill with ceramic balls until 98% of the ground material was finer than 200 mesh. No reagents were used in the mill.

Conditioning: The two ground materials were mixed and diluted to 20% solids. The pH was 2.80. Tap water pH was 7.6. After adding 0.04 g of MIBC and 0.04 g of kerosene, the slurry was conditioned 2 minutes.

Rougher Flotation: The conditioned slurry was floated 4 minutes to remove the bulk of the Rougher elemental sulphur froth; then 0.04 g of kerosene and 0.04 g of MIBC were added and flotation continued for

TABLE 34

Flotation Results - Test No. 27

| Product | Weight (g) | Weight (%) | Ignition Analysis Results | | Metallurgical Balance | | Distribution of Elemental Sulphur Recovered (%) |
| | | | Ash-Impurity (%) | Elemental Sulphur-Purity (%) | Ash | Elemental Sulphur | |
| --- | --- | --- | --- | --- | --- | --- | --- |
| Final Flotation Concentrate | 848.20 | 86.62 | 14.2 | 85.8 | 12.30 | 74.32 | 98.71 |
| Midds No. 1 | 24.74 | 2.53 | 94.4 | 5.6 | 2.39 | 0.14 | 0.19* |
| Midds No. 2 | 19.60 | 2.00 | 93.0 | 7.0 | 1.86 | 0.14 | 0.19** |
| Midds No. 3 | 8.76 | 0.89 | 86.6 | 13.4 | 0.77 | 0.12 | 0.16*** |
| Flotation Tailing | 77.9 | 7.96 | 93.6 | 6.4 | 7.45 | 0.51 | 0.67 |
| TOTAL | 979.27 | 100.00 | — | — | 24.77 | 75.23 | 100.00 |

*Tailings from the second stage of flotation - cleaning.
**Tailings from the third stage of flotation - recleaning No. 1.
***Tailings from the fourth stage of flotation - recleaning No. 2.

| | Ash (%) | Elemental Sulphur Content (%) |
| --- | --- | --- |
| Calculated Feed Analysis | 24.77 | 75.22 (from Table 34 by summation) |
| Feed Sample Analysis by Ignition | 29.4 | 70.6 (from Table 32) |

3 minutes. Another addition of 0.02 g of both MIBC and kerosene were added and flotation continued for 3 minutes. Very little sulphur floated in the last 3 minutes. Total flotation time was 10 minutes. The pH of the tailing was 3.09.

Cleaner Flotation: The Rougher froth was cleaned 3 times–5 minutes each stage. Midway through each 5 minute period, 0.02 g of kerosene and 0.02 g of MIBC were added. At the end of each stage another 0.02 g each of MIBC and kerosene were added to float any remaining fine sulphur. The pH of the three tailings were 3.46, 5.09 and 7.02 respectively. No sodium silicate was used in this test.

The following are the calculations and material balance on products resulting from this test.

TABLE 35

Flotation Results - Test No. 28

| Product | Weight (g) | Weight (%) | Ignition Analysis Results Ash-Impurity (%) | Elemental Sulphur-Purity (%) | Metallurgical Balance Ash | Elemental Sulphur | Distribution of Elemental Sulphur Recovered (%) |
|---|---|---|---|---|---|---|---|
| Final Flotation Concentrate | 906.10 | 90.66 | 1.8 | 98.2 | 1.63 | 89.03 | 95.74 |
| Midds No. 1 | 20.33 | 2.03 | 44.6 | 55.4 | 0.91 | 1.13 | 1.22* |
| Midds No. 2 | 7.91 | 0.79 | 26.8 | 73.2 | 0.21 | 0.58 | 0.62** |
| Midds No. 3 | 6.66 | 0.67 | 27.8 | 72.2 | 0.18 | 0.48 | 0.52*** |
| Flotation Tailing | 58.48 | 5.85 | 69.8 | 30.2 | 4.08 | 1.77 | 1.90 |
| TOTAL | 999.48 | 100.0 | — | — | 7.01 | 92.99 | 100.00 |

*Tailings from the second stage of flotation - cleaning.
**Tailings from the third stage of flotation - recleaning No. 1.
***Tailings from the fourth stage of flotation - recleaning No. 2.

| | Ash (%) | Elemental Sulphur Content (%) |
|---|---|---|
| Calculated Feed Analysis | 7.01 | 92.99 (from Table 35 by summation) |
| Feed Sample Analysis by Ignition | 6.91 | 93.09 (calculated from Tables 30 and 32) |

Manipulation, soluble and moisture losses = 1009 − 999.48 = 9.52

Reagents Used:
MIBC 0.44 lbs/ton
Kerosene 0.44 lbs/ton

Comments:

The elemental sulphur recovery, including half of the Midds, was 96.92% with a purity of 98.2%.

Eliminating the sodium silicate in the test on a composite sample did not adversely affect the flotation results.

The prediction of the elemental sulphur purity in a composite sample containing:
contaminated elemental sulphur,
complex sulphur agglomerate, reject by-product from hot melting processes, may be accomplished through the use of the following formulae:

$$a_1 \times b_1 = c_1 \quad (1)$$
$$a_2 \times b_2 = c_2$$
$$c_1 \times c_2 = c_3 \quad (2)$$

in which, $a_1$ is the fraction of complex sulphur agglomerate, reject by-product from hot melting processes intended to be used in combined plant feed.

$a_2$ the fraction of contaminated elemental sulphur intended to be used in combined plant feed.

$b_1$ elemental sulphur purity obtainable from complex sulphur agglomerate, reject by-product from hot melting processes alone (%).

$b_2$ elemental sulphur purity obtainable from contaminated elemental sulphur (%).

$c_1$ contribution in elemental sulphur purity of the complex sulphur agglomerate, reject by-product from hot melting processes intended to be used in combined plant feed (%).

$c_2$ contribution in elemental sulphur purity of the contaminated elemental sulphur intended to be used in combined plant feed (%).

$c_3$ overall elemental sulphur purity of intended composite plant feed after taking into account unavoidable process losses in elemental sulphur purity up to 2%.

Example using data from tests No. 25, 26, and 28:

Input Data

| | |
|---|---|
| $a_1$ = 0.05 (test No. 28) | $b_1$ = 88.6% (test No. 26) |
| $a_2$ = 0.95 (test No. 28) | $b_2$ = 99.00% (test No. 25) |

Results $c_1$ = 4.43%
$c_2$ = 94.05%
$c_3$ = 98.48% (test No. 28; elemental sulphur purity = 98.2%; the differencee is 0.28% representing process losses)

A similar estimation for recovery of elemental sulphur, in a combined mixture of feed consisting of a small percentage of "sulphur crete melt residue" and a high percentage of contaminated elemental sulphur, by applying a combined "coarse" and "fine" flotation process, could be made by using the same type of formulae, taking into account unavoidable process losses in elemental sulphur recovery up to 2%.

Experiments conducted with frother, promoter/collector and regulating/dispersing reagents (three reagents)

Flotation Test No. 29—Using a Composite Sample

This test was performed on a composite sample made up from 90% contaminated elemental sulphur—sample No. 500—from an elemental sulphur base pad at a gas plant and 10% complex sulphur agglomerate, reject by-product from hot melting processes—sample No. 301—collected from remelt settling tank bottoms.

Procedure:

Attrition Scrubbing: 910 g of sample No. 500, finer than 10 mesh, was attrition scrubbed for 15 minutes with 540 g of tap water (pH=7.47) at 62.5% solids.

Ball Milling: 100 g of sample No. 301 was ground in an Abbe porcelain mill with ceramic balls for 25 minutes at 62% solids until 98% of the ground material was finer than 200 mesh. 0.5 g of sodium silicate was added to the mill.

Conditioning: Both these slurries were combined and diluted to 20% solids. pH was 2.21. After adding 0.04 g of MIBC and 0.04 g of kerosene, the slurry was conditioned for 2 minutes.

Rougher Flotation: This stage lasted 10 minutes, time in which two additions of 0.04 g of both MIBC and kerosene were necessary. The pH of the Rougher tailing was 2.60.

Cleaner Flotation: The Rougher froth was cleaned in three stages of 5 minutes each. The reagents used in each stage were 0.04 g of MIBC, 0.04 g of kerosene and 0.25 g of sodium silicate. The corresponding pH obtained for Midds No. 1, 2 and 3 were 3.24, 4.06 and 6.48 respectively.

The following are the calculations and material balance on products resulting from this test.

TABLE 36

Flotation Results - Test No. 29

| Product | Weight (g) | Weight (%) | Ash- Impurity (%) | Elemental Sulphur- Purity (%) | Metallurgical Balance Ash | Metallurgical Balance Elemental Sulphur | Distribution of Elemental Sulphur Recovered (%) |
|---|---|---|---|---|---|---|---|
| Final Flotation Concentrate | 899.20 | 89.67 | 2.40 | 97.60 | 2.15 | 87.52 | 94.52 |
| Midds No. 1 | 21.08 | 2.10 | 37.0 | 63.0 | 0.78 | 1.32 | 1.43* |
| Midds No. 2 | 9.71 | 0.97 | 21.8 | 78.2 | 0.21 | 0.76 | 0.82** |
| Midds No. 3 | 8.26 | 0.82 | 25.0 | 75.0 | 0.20 | 0.62 | 0.67*** |
| Flotation Tailing | 64.56 | 6.44 | 63.2 | 36.8 | 4.07 | 2.37 | 2.56 |
| TOTAL | 1002.81 | 100.00 | — | — | 7.41 | 92.59 | 100.00 |

*Tailings from the second stage of flotation - cleaning.
**Tailings from the third stage of flotation - recleaning No. 1.
***Tailings from the fourth stage of flotation - recleaning No. 2.

| | Ash (%) | Elemental Sulphur Content (%) |
|---|---|---|
| Calculated Feed Analysis | 7.41 | 92.59 (from Table 36 by summation) |
| Feed Sample Analysis by Ignition | 8.07 | 91.93 (calculated from Tables 30 and 32) |

Manipulation, soluble and moisture losses = 1010 − 1002.81 = 7.19

Reagents Used:
MIBC, 0.48 lbs/ton
Kerosene, 0.48 lbs/ton
Sodium Silicate, 2.50 lbs/ton Comments:
The elemental sulphur recovery, including half of the Midds, was 95.98% with a purity of 97.6%.

All the coarse sulphur floated. The final elemental sulphur had a gray colour due to the fine "sulphur crete" material present in the concentrate.

Flotation Test No. 30—Using a Composite Sample

This test was performed on a composite sample made up from 80% contaminated elemental sulphur—sample No. 500—from an elemental sulphur base pad at a gas plant and 20% complex sulphur agglomerate, reject by-product from hot melting processes—sample No. 301—collected from remelt settling tank bottoms.

Procedure:

Attrition Scrubbing: 809 g of sample No. 500, finer than 10 mesh, was attrition scrubbed for 15 minutes with 480 g of tap water (pH=7.47) at 62.5% solids.

Ball Milling: 200 g of sample No. 301 was ground in an Abbe porcelain mill with ceramic balls for 40 minutes at 62% solids until 98% of the ground material was finer than 200 mesh. 0.5 g of sodium silicate was added to the mill.

Conditioning: The combined slurry was diluted to 20% solids, pH was 2.43, and was conditioned for 2 minutes with 0.04 g of MIBC and 0.04 g of kerosene.

Rougher Flotation: This stage lasted 10 minutes. Two additions of 0.04 g of both MIBC and kerosene were necessary. The pH of the Rougher tailing was 3.47.

Cleaner Flotation: The Rougher froth was cleaned in three stages of 5 minutes each. The reagents used in each stage were 0.04 g of MIBC, 0.04 g of kerosene and 0.25 g of sodium silicate. The corresponding pH obtained for Midds No. 1, 2 and 3 were 3.79, 4.24 and 6.27 respectively.

The following are the calculations and material balance on products resulting from this test.

TABLE 37

Flotation Results - Test No. 30

| | Ignition Analysis Results | | Metallurgical Balance | Distribution of Elemental Sulphur |
|---|---|---|---|---|
| | Ash- | Elemental Sulphur- | | |

TABLE 37-continued

| Product | Weight (g) | Weight (%) | Impurity (%) | Purity (%) | Ash | Elemental Sulphur | Recovered (%) |
|---|---|---|---|---|---|---|---|
| Final Flotation Concentrate | 897.06 | 89.96 | 4.2 | 95.8 | 3.78 | 86.18 | 95.23 |
| Midds No. 1 | 15.2 | 1.53 | 51.2 | 48.8 | 0.78 | 0.74 | 0.82* |
| Midds No. 2 | 6.66 | 0.67 | 43.2 | 56.8 | 0.29 | 0.38 | 0.42** |
| Midds No. 3 | 4.91 | 0.49 | 48.0 | 52.0 | 0.24 | 0.26 | 0.29*** |
| Flotation Tailing | 73.30 | 7.35 | 60.0 | 40.0 | 4.41 | 2.94 | 3.25 |
| TOTAL | 997.15 | 100.00 | — | — | 9.50 | 90.50 | 100.00 |

*Tailings from the second stage of flotation - cleaning.
**Tailings from the third stage of flotation - recleaning No. 1.
***Tailings from the fourth stage of flotation - recleaning No. 2.

| | Ash (%) | Elemental Sulphur Content (%) |
|---|---|---|
| Calculated Feed Analysis | 9.50 | 90.50 (from Table 37 by summation) |
| Feed Sample Analysis by Ignition | 10.44 | 89.56 (calculated from Tables 30 and 32) |

Manipulation, soluble and moisture losses = 1009 − 997.15 = 11.85

Reagents Used:
MIBC 0.48 lbs/ton
Kerosene 0.48 lbs/ton
Sodium Silicate 2.50 lbs/ton Comments:
The elemental sulphur recovery, including half of the Midds, was 96.00% with a purity of 95.80%.

BRIEF DESCRIPTION OF THE DRAWING

In the drawings which accompany this specification.

APPLICATION OF THE NEW PROCESS

Figure 1:
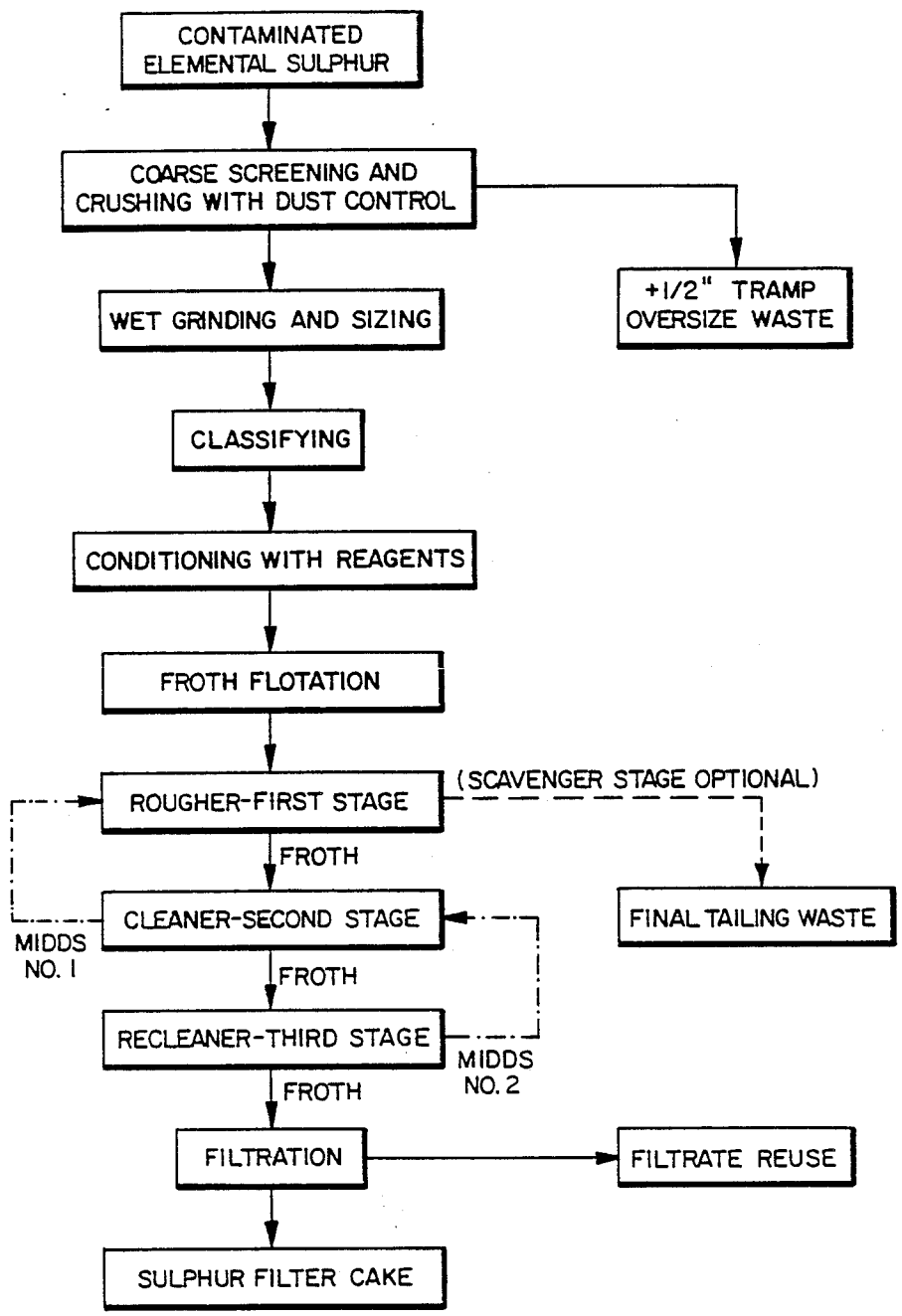
FIG. 1 is a schematic flow sheet showing the main steps of the present invention.

Based on laboratory investigations and engineering studies, a schematic flow sheet for the Recovery of Elemental Sulphur from Products Containing Contaminated Elemental Sulphur by Froth Flotation was developed and is shown in FIG. 1. Also, as an example, a froth flotation plant schematic is presented for a "coarse" type flotation process with particles finer than 10 mesh with a substantial amount of larger than 48 mesh in the slurry, in FIGS. 2a and 2b. This incorporates a rotary scrubber breaker for initial plant input material preparation, followed by classification in a spiral classifier (or other type of mechanical classification means and/or vibration screen). By this classification the slime and fine particles are removed in the spiral classifier overflow. The densified underflow product is directed to the size reduction apparatus. The size reduction is conducted in an attrition scrubber (or other type of size reduction apparatus) to reduce particle size from minus ¼ inch to finer than 10 mesh for a "coarse" flotation.

Figure 2A:
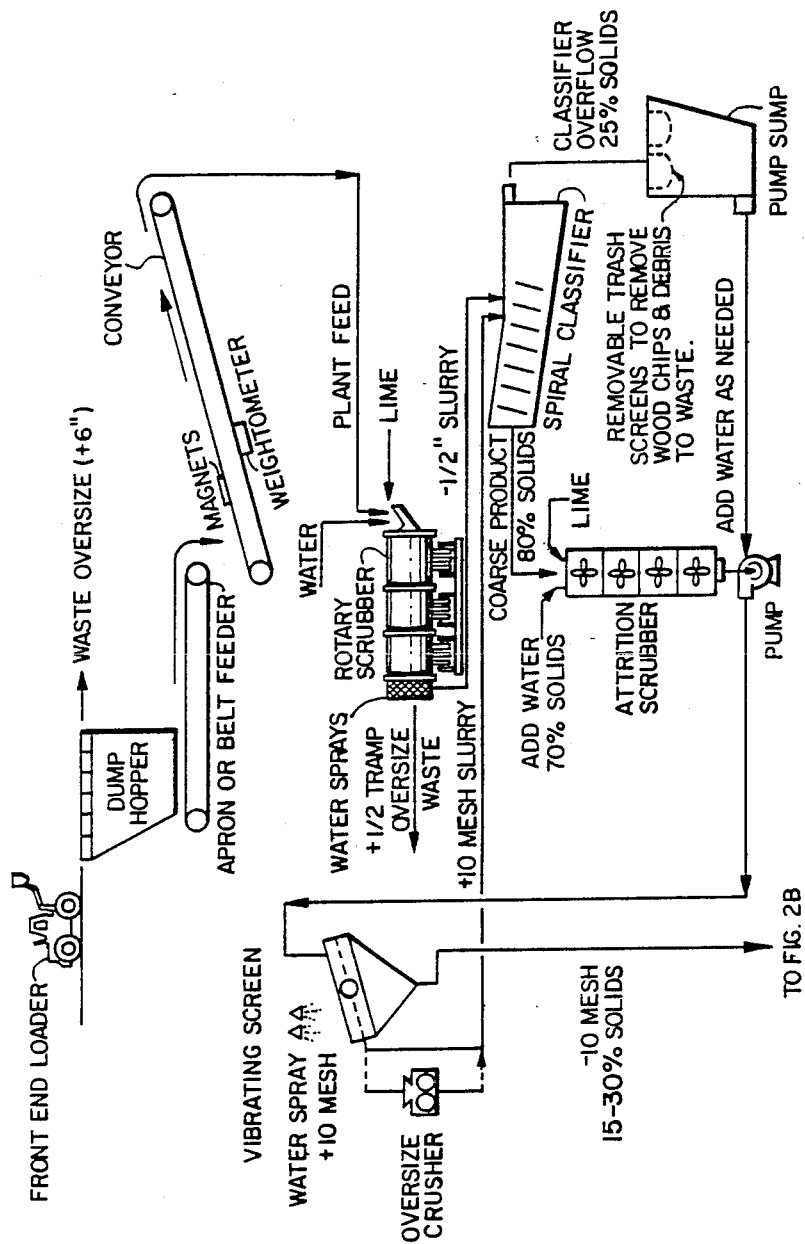
FIGS. 2a and 2b are schematic flow sheets of an example of a coarse froth flotation plant for the treatment of contaminated elemental sulphur for the recovery of elemental sulphur.
Figure 2B:
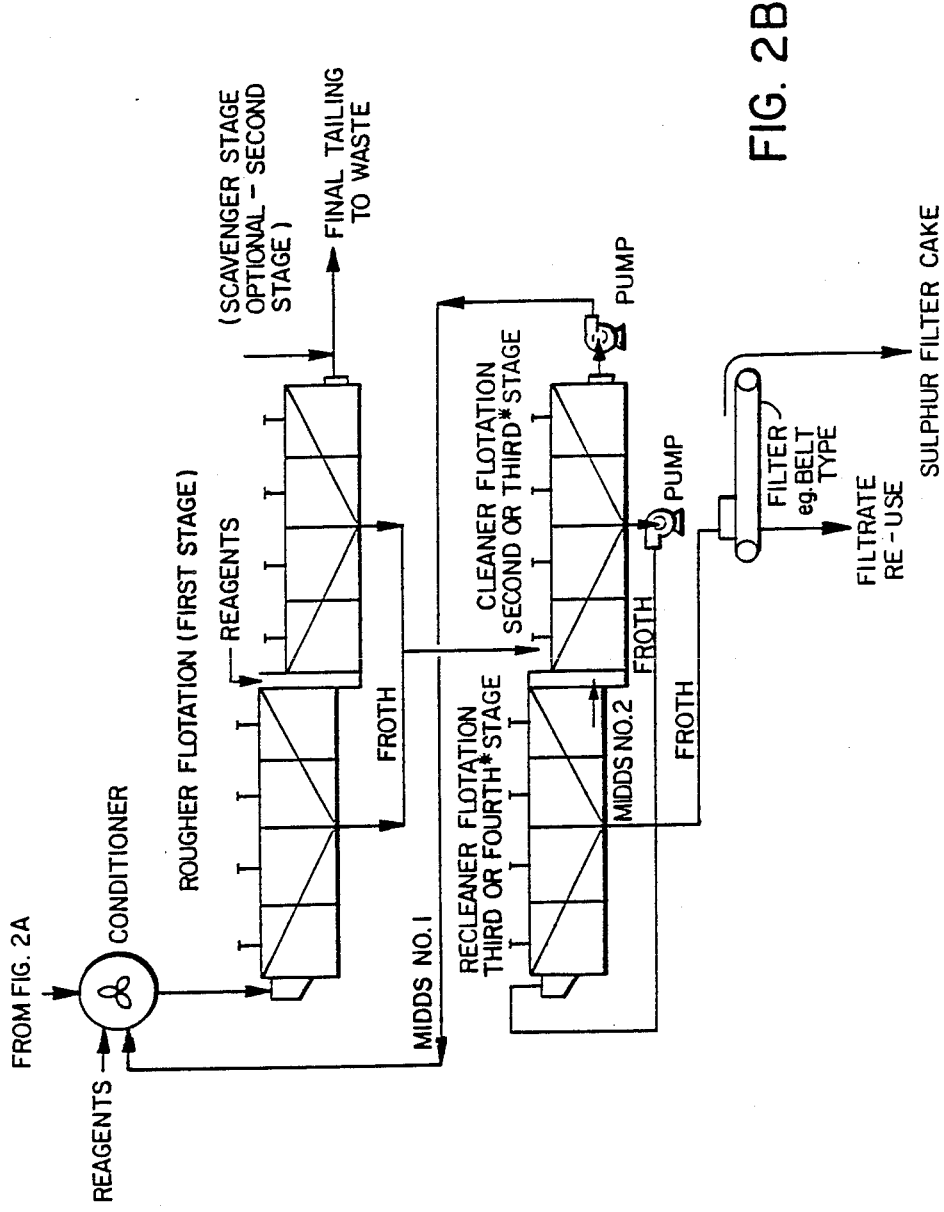
Figure 3:
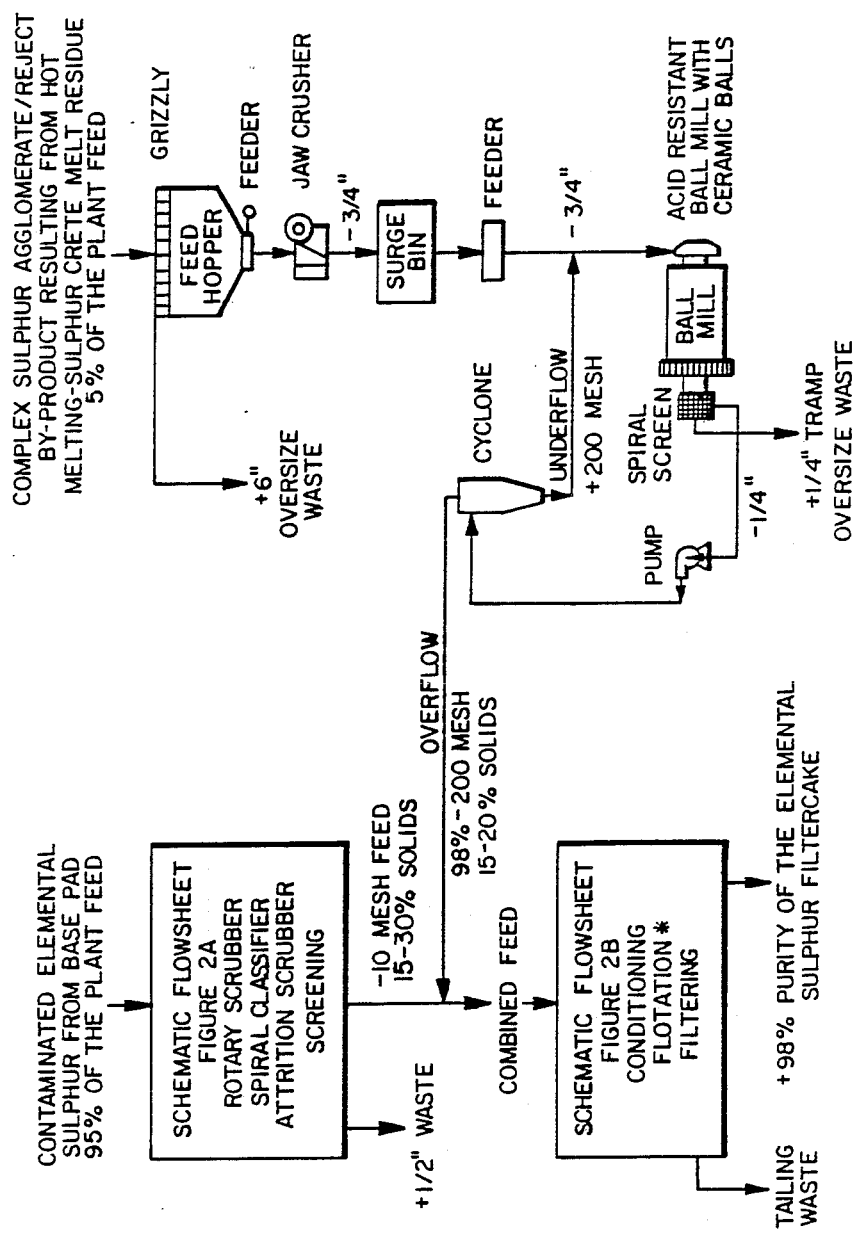
FIG. 3 shows an example of a combined "coarse" and "fine" flotation process for the treatment of feedstock where the major component is contaminated elemental sulphur and the balance is complex sulphur agglomerate ("sulphur crete melt residue").

The froth flotation plant shown schematically in FIGS. 2a and 2b can have feed capacities varying generally from 100 to 500 metric tonnes/24 hours and could be built as a mobile system. The initial plant capacity could be increased up to the desired capacity by the addition of modular units.

The estimated flotation reagent cost per metric tonne of contaminated elemental sulphur, is in the order of 65 to 90 cents, when floating a more granular product.

The economics of the flotation process, compared with a hot melting process, are more attractive because the elemental sulphur recovery is higher, especially with increasing quantity and fineness of impurities in the material to be treated, which could often be the case.

The example of an industrial "coarse" type froth flotation process (FIGS. 2a and 2b), with particles finer than 10 mesh with a substantial amount of particles larger than 48 mesh in the slurry, contains the following steps of operation:

1. Coarse Size Reduction and Sizing

The contaminated elemental sulphur plant input material is obtained from the existing elemental sulphur block base pads, stockpiles or other sources by mechanical back-hoe, front-end loader or other means and transported to the processing plant storage hopper and feeder. A rail grizzly is normally placed over the hopper to remove tramp oversize, roots and foreign debris which may contaminate the base pads, stockpiles or other existing sources. Storage capacity in the hopper is provided to maintain a uniform feed rate to the plant by means of a belt, pan, or apron feeder. Feed is conveyed by a belt to a rotary scrubber having lifters to assist in breaking down any coarse lumps of elemental sulphur. Water and sprays are added to this unit to assist in pulping the solids and in screening out plus ½ inch tramp oversize. A rotary screen is attached to the end of the rotary scrubber to accomplish this sizing operation. Since this operation is carried out wet, dusting is minimal.

2. Classification and Size Reduction Utilizing an Attrition Scrubber

The minus ½ inch slurry discharging from the rotary scrubber breaker flows to a spiral or screw classifier, primarily for densifying the classifier underflow before it is introduced to the feed end of the attrition scrubber. For efficient operation, the input material must be 70% solids or slightly higher. Retention time in the attrition scrubber is in the order of 5 to 10 minutes. Sufficient lime to minimize equipment corrosion should be added here, as well as to the rotary scrubber breaker described in point 1, above.

Size reduction utilizing an attrition scrubber produces granular and clean elemental sulphur particles having an enhanced lustre, thus making these particles, as coarse as 10 mesh (2 mm), respond to reagents and flotation.

Discharge slurry from the attrition scrubber is transported by pump to a vibrating screen fitted with a stainless steel or rubber covered screen cloth. The screen oversize is returned to the classifier. It can be crushed, if necessary, for further treatment. The screen undersize is sent to flotation through the conditioner.

3. Conditioning and Flotation

The spiral classifier overflow, with approximately 25% solids, is passed over a stationary trash screen to remove oversize wood chips and tramp oversize. The classifier overflow, after passing through the trash screen, joins the output material from the attrition scrubber and is pumped to the vibrating screen. The finer than 10 mesh screen undersize is the feed to the conditioner and then to the flotation process. This feed is conditioned with reagents (such as: MIBC and kerosene or fuel oil) for about 3 minutes in the conditioner. This ensures effective use of reagents in filming the granular and fine sulphur particles prior to flotation.

The conditioned slurry could flow by gravity or be pumped to the Rougher flotation machine. This machine which produces the Rougher flotation elemental sulphur concentrate should be sized to provide at least ten minutes retention time for the quantity of material designed to be treated per hour. This flotation machine could be arranged, for example, in two sections with three or four cells in each series. Stage adding of some additional reagents (such as: kerosene or fuel oil and MIBC) is necessary to float any remaining sulphur after the initial froth removal in the first three or four cells. Rougher flotation time includes recycling of Cleaner tailings or Midds No. 1. When the Rougher froth has less than 50% elemental sulphur purity, the Rougher flotation circuit should include a Scavenger stage.

The Rougher flotation froth concentrate is cleaned (Cleaner stage) and recleaned (Re-Cleaner stage) in a second bank of flotation cells, each stage being similar to the Rougher stage in flow arrangement but generally with half of the number of cells. Each cleaner section provides approximately 5 minutes flotation retention time, including recycling of the corresponding Middlings. During the flotation, after any stage, if the elemental sulphur recovery and purity are sufficiently high, then the froth could be directed to the filters, by-passing the remaining cleaning stages.

4. Filtration

Filtration of cleaned flotation concentrate should be done on a horizontal vacuum belt filter, since the elemental sulphur product is coarse and granular (generally, minus 10 mesh with a small percentage of minus 200 mesh particles). Filter tests showed moisture content of the filter cake being near 10%. Further moisture reduction can be obtained by using hot water sprays on the belt filter cake. This granular product ground in an attrition scrubber will be easier to transport by belt conveyor and probably easier to melt than the fine elemental sulphur flotation product resulting from ball milling for size reduction. Elemental sulphur purity of the dried filter cake could be 98% or higher with a recovery over 95% as shown in the Tests No. 16, 20 and 21.

Processing of complex sulphur agglomerate, reject by-product resulting from hot melting processes requires the use of "fine" flotation wherein the size reduction apparatus used is a ball mill to reduce the size of the feed to finer than 48 mesh with a substantial amount finer than 100 to 200 mesh. This "fine" flotation can result in sulphur purities up to 93.8% as shown in test No. 23.

The purity of the recovered product may be increased, by applying the combined process of "coarse" and "fine" flotation, to up to 98.2% as shown in tests No. 28, 29 and 30.

The combined flotation process is desirable where feedstock containing contaminated elemental sulphur as well as "sulphur crete" is available. Laboratory testing showed the major component should be contaminated elemental sulphur with the balance being "sulphur crete". To determine the optimum ratio between the two types of feedstock, the formulae (1) and (2) derived in test No. 28 should be applied.

Although the process of this invention has been described hereinabove in detail with reference to certain specific embodiments it will be apparent to persons skilled in the art that variations and modifications of the process may be made without departing from the basic inventive concept. It is intended therefore that the present invention not be limited by what has been specifically described hereinabove and illustrated in the accompanying drawings, but be limited only by the claims which follow.

I claim:

1. A process for the recovery by froth flotation of elemental sulphur in the oil and gas industry from a feedstock comprising contaminated elemental sulphur, said feedstock being selected from the group consisting of:
   (1) contaminated base pads of elemental sulphur blocks;
   (2) stockpiles of contaminated elemental sulphur;
   (3) contaminated elemental sulphur rejects from industrial handling and hauling; and
   (4) other sources of contaminated elemental sulphur in said industry; which comprises the steps of:
      (a) coarse screening the contaminated elemental
      (b) treating the coarse screening undersize to wet scrubbing in a rotary scrubber and hydraulically sizing the rotary scrubbed slurry to produce a coarse fraction slurry and a fine fraction slurry, attrition scrubbing said coarse fraction slurry;
      (c) size classifying at least one of said attrition scrubbed coarse fraction slurry or said fine fraction slurry to produce an undersize slurry of minus 10 mesh and adjusting said undersize slurry to at least 25% solids, returning the oversized fraction from said size classifying to said hydraulic sizing;
      (d) conditioning the minus 10 mesh undersize slurry with two classes of reagents using a frother reagent and and a promoter/collector reagent;
      (e) subjecting the slurry-reagent composition to at least one stage of froth flotation to produce an elemental sulphur concentrate; and
      (f) filtering and dewatering the resultant elemental sulphur concentrate.

2. A process for the recovery by froth flotation of elemental sulphur from contaminated products resulting from exploitation processes using wells for the application of heat to reservoirs in order to recover elemental sulphur, which comprises the steps of:

(a) coarse screening the contaminated elemental sulphur;

(b) treating the coarse screening undersize to wet scrubbing in a rotary scrubber and hydraulically sizing the rotary scrubbed slurry to produce a coarse fraction slurry and a fine fraction slurry, attrition scrubbing said coarse fraction slurry;

(c) size classifying at least one of said attrition scrubbed coarse fraction slurry or said fine fraction slurry to produce an undersize slurry of minus 10 mesh and adjusting said undersize slurry to at lest 25% solids, returning the oversized fraction from said size classifying to said hydraulic sizing;

(d) conditioning the minus 10 mesh undersize slurry with two classes of reagents using a frother reagent and a promoter/collector reagent;

(e) subjecting the slurry-reagent composition to at least one stage of froth flotation to produce an elemental sulphur concentrate; and (f) filtering and dewatering the resultant elemental sulphur concentrate.

3. A process for the recovery by froth flotation of elemental sulphur from contaminated elemental sulphur rejects resulting from industrial processes other than in the oil and gas industry, with the exception of hot melting residues, which comprises the steps of:

(a) coarse screening the contaminated elemental sulphur;

(b) treating the coarse screening undersize to wet scrubbing in a rotary scrubber and hydraulically sizing the rotary scrubbed slurry to produce a coarse fraction slurry and a fine fraction slurry, attrition scrubbing said coarse fraction slurry;

(c) size classifying at least one of said attrition scrubbed coarse fraction slurry or said fine fraction slurry to produce an undersize slurry of minus 10 mesh and adjusting said undersize slurry to at least 25% solids, returning the oversized fraction from said size classifying to said hydraulic sizing;

(d) conditioning the minus 10 mesh undersized slurry with two classes of reagents using a frother reagent and a promoter/collector reagent;

(e) subjecting the slurry-reagent composition to at least one stage of froth flotation—to produce an elemental sulphur concentrate; and (f) filtering and dewatering the resultant elemental sulphur concentrate.

4. A process according to claim 1, 2, or 3 wherein, in step (c), the contaminated elemental sulphur coarse fraction slurry is adjusted to at least 65% solids, for proper attrition scrubbing.

5. A process according to claim 1, 2, or 3 wherein, in step (e), the flotation circuit includes a scavenger stage when the rougher stage froth has less than 50% elemental sulphur purity to float any remaining elemental sulphur from the tailings.

6. A process of claim 1, 2 or 3 wherein, in step (e), the slurry-reagent composition is subjected to two stages of froth flotation—a Rougher stage and a Cleaning stage—to produce an elemental sulphur concentrate.

7. A process according to claim 1, 2, or 3 wherein the contaminated elemental sulphur products which are being treated by said process are elemental sulphur products contaminated with at least one of inorganic material or organic material.

8. The process of claim 1, 2, or 3 wherein said frother reagent comprises an alcohol frother or a mixture of alcohol frothers.

9. The process of claim 8 wherein the alcohol frother is MIBC (methyl isobutyl carbinol).

10. A process in accordance with claim 9 wherein the promoter/collector is fuel oil.

11. The process of claim 1, 2 or 3 wherein one of said classes of reagents with which the minus 10 undersize slurry is conditioned is a promoter/collector selected from kerosene, fuel oil, and mixtures thereof.

12. The process of claim 1, 2 or 3 wherein the minus 10 undersize slurry is conditioned with both a frother reagent and a promoter/collector reagent, said frother reagent being MIBC (methyl isobutyl carbinol) and said promoter collector reagent being kerosene or fuel oil.

13. The process of claim 1, 2, or 3 wherein lime is present during flotation for minimizing corrosion of the flotation equipment.

14. A process in accordance with claim 13 wherein said lime is added to the contaminated elemental sulphur slurry during the step of wet scrubbing.

15. A process as defined in claims 1, 2 or 3 wherein methyl isobutyl carbinol (MIBC) is employed in the order of 0.08 to 0.5 lb. of MIBC frother per ton of dry material subjected to flotation and kerosene or fuel oil is employed in the order of 0.05 to 0.5 lb. per ton of dry material subjected to flotation.

16. A process in accordance with claim 1, 2, or 3 wherein lime is present during flotation for minimizing corrosion of the flotation equipment, in the order of 1 to 10 lb. per ton of dry material treated.

17. A process according to claim 1, 2 or 3 wherein, in step (e), said slurry-reagent composition is subjected to three stages of froth flotation.

18. A process according to claim 1, 2, or 3 wherein, in step (e), said slurry-reagent composition is subjected to four stages of froth flotation.

19. A process in accordance with claim 1, 2, or 3 wherein the first stage of froth flotation is carried out for a period in the order of 10–15 minutes.

20. A process according to claim 19 wherein the flotation comprises more than one stage and each subsequent stage of froth flotation is conducted for a period of about one-half that of the first stage.

21. A process in accordance with claim 1, 2, or 3 wherein, in step (f), the elemental sulphur concentrate is filtered and dewatered to a final moisture content of 10%–20% by weight of said elemental sulphur.

22. A process in accordance with claim 1, 2, or 3 wherein, in step (f), the elemental sulphur concentrate is filtered and dewatered to a final moisture content of approximately 10% by weight of said elemental sulphur.

23. A process in accordance with claim 1, 2, or 3 wherein the conditioned contaminated elemental sulphur slurry from step (d) flows by gravity to the first stage of froth flotation.

24. A process in accordance with claim 1, 2, or 3 wherein, in step (e), said slurry-reagent composition is subjected to a plurality of stages of froth flotation, of which the first stage is a "rougher" flotation stage, the plurality of stages further including a scavenger stage when the rougher froth has less than 50% elemental sulphur purity, the plurality of stages further includes "cleaner" stages.

* * * * *

UNITED STATES PATENT AND TRADEMARK OFFICE
CERTIFICATE OF CORRECTION

PATENT NO. : 4,871,447

DATED : October 3, 1989

INVENTOR(S) : Ion I. Adamache

It is certified that error appears in the above-identified patent and that said Letters Patent is hereby corrected as shown below:

Column 2, Line 16
    "enironmental" should be --environmental--

Column 2, Line 22
    "burning" should begin new paragraph

Column 3, Line 63
    delete "pl"
    "forming" should begin new paragraph

Column 9, Line 19
    "50" should be --5.0--

Column 9, Line 57
    "sould" should be --should--

Column 10, Line 57
    "application" should be --applications--

Column 11, Line 11
    "not" should be --hot--

Column 11, Line 21
Column 12, Line 13
    "element" should be --elemental--

Column 14, Line 33
    "The first" should begin a new paragraph

UNITED STATES PATENT AND TRADEMARK OFFICE
CERTIFICATE OF CORRECTION

PATENT NO. : 4,871,447

DATED : October 3, 1989

INVENTOR(S) : Ion I. Adamache

It is certified that error appears in the above-identified patent and that said Letters Patent is hereby corrected as shown below:

Column 15, Table 3, Note:
"ditribution" should be --distribution--
"22.8" should be --22.88--

Column 15, Line 20
"calculationg" should be --calculation--

Column 15, Line 39-40
"calcuated" should be --calculated--

Column 15, Line 35
"calculations" should be --calculates--

Column 18, Table 6, last column
"Recovered" (1st) should be --Elemental--

Column 22, Table 10, after "Midds No. 1"
"49.95" should be --49.94--

Column 24, Table 12 *
"tne" should be --the--

Column 34, Table 19, under "Product" heading
"florrion" should be --flotation--

Column 38, Line 62
"tha" should be --than--

Column 40, Line 3
after "performed" insert --for--

Column 43, Line 49
"100" should be --1000--

UNITED STATES PATENT AND TRADEMARK OFFICE
CERTIFICATE OF CORRECTION

PATENT NO. : 4,871,447

DATED : October 3, 1989

INVENTOR(S) : Ion I. Adamache

It is certified that error appears in the above-identified patent and that said Letters Patent is hereby corrected as shown below:

Column 43, Line 66
    "MIC" should be --MIBC--

Column 45, Table 29
    "97.24" should be --97.27--
    "18.6" should be --18.62--
    "1.8" should be --1.86--
    "0.2" should be --0.20--
    "0.8" should be --0.87--
    "997.2" should be --997.27--

Column 46, Line 61
    "product" should be --products--

Column 47, Table 31
    "1009.7" should be --1009.77--
    "sumation" should be --summation--

Column 48, Table 33
    "13.7" should be --13.74--

Column 51, Table 35
    "30 and 32)" should be moved to next column

Column 52, Line 56
    "differencee" should be --difference--

Column 55, Table 37
    "15.2" should be --15.22--

Column 57, Line 22
    "finger" should be --finer--

UNITED STATES PATENT AND TRADEMARK OFFICE
CERTIFICATE OF CORRECTION

PATENT NO. : 4,871,447

DATED : October 3, 1989

INVENTOR(S) : Ion I. Adamache

It is certified that error appears in the above-identified patent and that said Letters Patent is hereby corrected as shown below:

Column 58, Line 46
    after "elemental" insert --sulphur;--

Column 59, Line 13
    "lest" should be --least--

Column 59, Line 47
    delete the hyphen

Signed and Sealed this

Seventeenth Day of March, 1992

Attest:

HARRY F. MANBECK, JR.

*Attesting Officer*       *Commissioner of Patents and Trademarks*